(12) United States Patent
Boivie et al.

(10) Patent No.: US 8,850,557 B2
(45) Date of Patent: Sep. 30, 2014

(54) PROCESSOR AND DATA PROCESSING METHOD WITH NON-HIERARCHICAL COMPUTER SECURITY ENHANCEMENTS FOR CONTEXT STATES

(75) Inventors: Richard H. Boivie, Monroe, CT (US); William E. Hall, Clinton, CT (US); Guerney D. H. Hunt, Yorktown Heights, NY (US); Paul A. Karger, Chappaqua, NY (US); Carl Lynn C. Karger, legal representative, Chappaqua, NY (US); Suzanne K. McIntosh, Clifton, NJ (US); Mark F. Mergen, Mount Kisco, NY (US); Marcel C. Rosu, Ossining, NY (US); David R. Safford, Brewster, NY (US); David C. Toll, Wappingers Falls, NY (US)

(73) Assignee: International Business Machines Corporation, Armonk, NY (US)

(*) Notice: Subject to any disclaimer, the term of this patent is extended or adjusted under 35 U.S.C. 154(b) by 346 days.

(21) Appl. No.: 13/408,170

(22) Filed: Feb. 29, 2012

(65) Prior Publication Data

US 2013/0227704 A1  Aug. 29, 2013

(51) Int. Cl.
*G06F 12/14* (2006.01)
*G06F 21/31* (2013.01)

(52) U.S. Cl.
CPC .................................... *G06F 21/31* (2013.01)
USPC .................. 726/17; 712/24; 712/33; 711/158

(58) Field of Classification Search
USPC ................... 711/100–173; 718/106; 715/781; 726/17
See application file for complete search history.

(56) References Cited

U.S. PATENT DOCUMENTS

| 4,569,018 A | 2/1986 | Hummel et al. |
| 5,148,544 A | 9/1992 | Cutler et al. |

(Continued)

FOREIGN PATENT DOCUMENTS

| EP | 1 221 654 A2 | 7/2002 |
| EP | 1 221 654 A3 | 6/2004 |

(Continued)

OTHER PUBLICATIONS

Arora, et al., "Secure Embedded Processing through Hardware-assisted Run-time Monitoring," IEEE Computer Society, Proceedings of the Design, Automation and Test in Europe Conference and Exhibition, 2005, 6 pages.

(Continued)

*Primary Examiner* — Nirav B Patel
*Assistant Examiner* — Mohammed Waliullah
(74) *Attorney, Agent, or Firm* — Gibb & Riley, LLC

(57) ABSTRACT

Disclosed are a processor and processing method that provide non-hierarchical computer security enhancements for context states. The processor can comprise a context control unit that uses context identifier tags associated with corresponding contexts to control access by the contexts to context information (i.e., context states) contained in the processor's non-stackable and/or stackable registers. For example, in response to an access request, the context control unit can grant a specific context access to a register only when that register is tagged with a specific context identifier tag. If the register is tagged with another context identifier tag, the contents of the specific register are saved in a context save area of memory and the previous context states of the specific context are restored to the specific register before access can be granted. The context control unit can also provide such computer security enhancements while still facilitating authorized cross-context and/or cross-level communications.

23 Claims, 21 Drawing Sheets

(56) References Cited

U.S. PATENT DOCUMENTS

| | | |
|---|---|---|
| 5,179,702 A | 1/1993 | Spix et al. |
| 5,247,629 A | 9/1993 | Casamatta et al. |
| 5,386,552 A | 1/1995 | Garney |
| 5,515,538 A | 5/1996 | Kleiman |
| 5,892,944 A | 4/1999 | Fukumoto et al. |
| 5,900,025 A * | 5/1999 | Sollars .......................... 712/248 |
| 5,966,529 A | 10/1999 | Sollars |
| 6,128,641 A | 10/2000 | Fleck et al. |
| 6,418,460 B1 | 7/2002 | Bitar et al. |
| 6,598,153 B1 * | 7/2003 | Flachs et al. ................. 712/234 |
| 7,024,672 B2 | 4/2006 | Callender et al. |
| 7,136,488 B2 | 11/2006 | Hashimoto et al. |
| 7,209,996 B2 | 4/2007 | Kohn et al. |
| 7,254,528 B2 | 8/2007 | Bowers et al. |
| 7,299,383 B2 | 11/2007 | David et al. |
| 7,350,204 B2 | 3/2008 | Lambert et al. |
| 7,461,232 B2 | 12/2008 | Nicolai |
| 7,577,954 B2 | 8/2009 | Shiota |
| 7,730,544 B2 | 6/2010 | Volp |
| 2002/0083297 A1 | 6/2002 | Modelski et al. |
| 2003/0088610 A1 | 5/2003 | Kohn et al. |
| 2003/0131203 A1* | 7/2003 | Berg et al. ..................... 711/146 |
| 2005/0081020 A1 | 4/2005 | Volp |
| 2010/0088739 A1 | 4/2010 | Hall et al. |
| 2010/0161948 A1* | 6/2010 | Abdallah ..................... 712/228 |
| 2014/0047219 A1* | 2/2014 | Gschwind et al. ............ 712/217 |

FOREIGN PATENT DOCUMENTS

| | | |
|---|---|---|
| EP | 1 522 923 A2 | 4/2005 |
| WO | WO 00/43878 | 7/2000 |

OTHER PUBLICATIONS

York, R., "A New Foundation for CPU Systems Security," ARM, May 2003, pp. 1-8.

AMCC, "Secure Embedded Processors," Enabling High-Performance Network Protection, May 26, 2005, pp. 1-7.

Suh, et al., "AEGIS: A Single-Chip Secure Processor," Information Security Technical Report, 2005, pp. 63-73.

d'Auriol, et al., "Embedded Processor Security," Department of Computer Engineering, Kyung Hee University, Korea, 2007, 4 pages.

Marr, et al., "Hyper-Threading Technology Architecture and Microarchitecture," Intel Technology Journal Q1, 2002, pp. 1-12.

Chien, et al., "Safe and Protected Execution for the Morph/AMRM Reconfigurable Processor," Apr. 1, 1999, pp. 1-13.

Madon, et al., "A Study of a Simultaneous Multithreaded Processor Implementation," Eruro-Par'99, LNCS 1685, 1999, pp. 716-726.

* cited by examiner

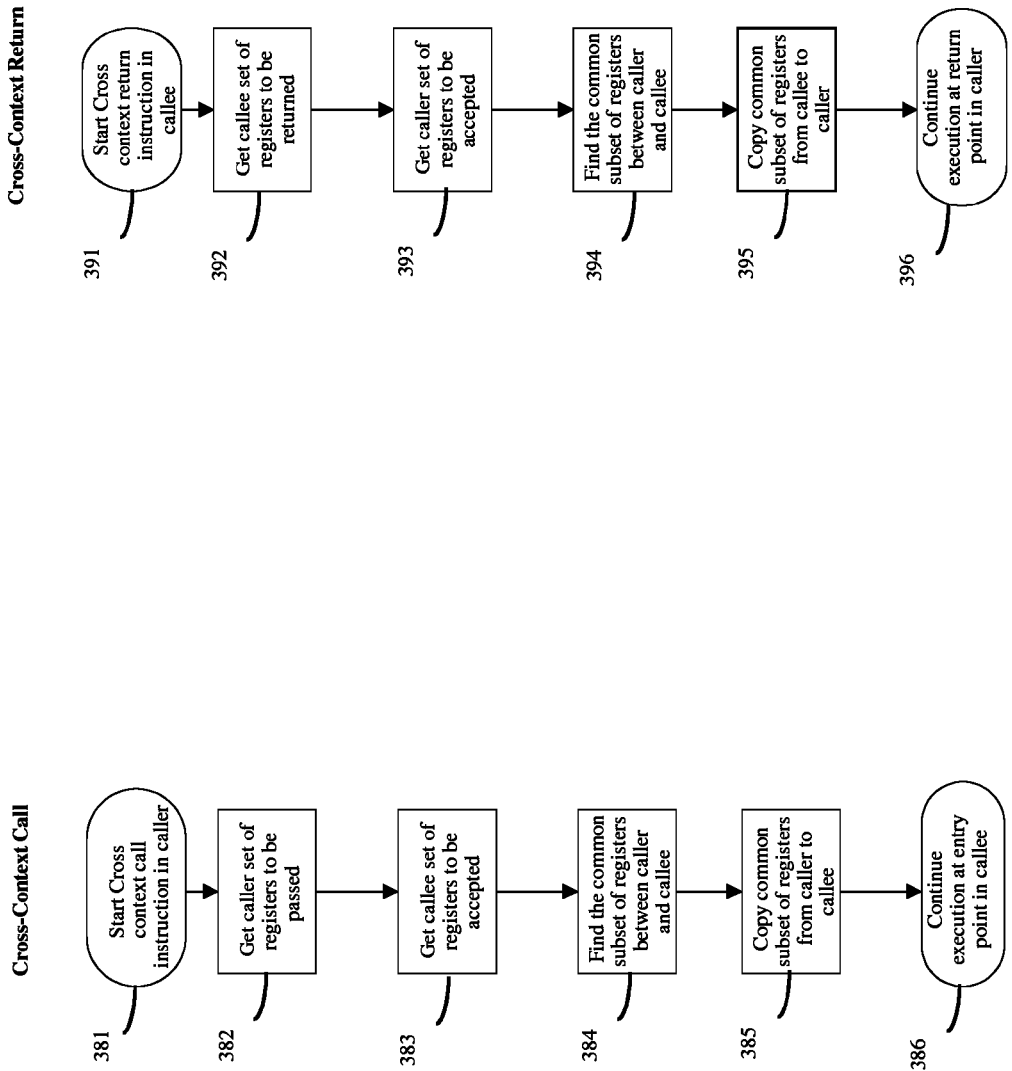

|  | Program | Supervisor (restricted) | Supervisor (unrestricted) |
|---|---|---|---|
| Existing | Processor Control<br>SPR4..7, USPR0<br><br>Branch Control<br>CR, CTR, LR, "PC"<br><br>Integer Processing<br>GPR0..31, XER<br><br>Floating Point<br>FPR0..31, FPSCR<br><br>Timer<br>TBL, TBU | Process Control<br>MSR, SPRG 0..3<br><br>Storage Control<br>PID<br><br>Interrupt Processing<br>ESR, MCSR, DEAR, SRR0..1,<br>CSRR0..1, MCSRR0..1<br><br>Timer<br>TCR, TSR, DEC, DECAR | Process Control<br>PVR, PIR, CCR0..1, RSTCFG<br><br>Storage Control<br>MMUCT, "TLB"<br><br>Interrupt Processing<br>IVPR, and IVOR0..15<br><br>Debug<br>DBSR, DBDR, DBCR0..2, DAC1..2,<br>DVC1..2, IAC1..4<br><br>Cache Control<br>IVLIM, InV0..3, ITV0..3, DVLIM0..3,<br>DTV0..3<br><br>Cache Debug<br>ICDBDR, ICDBTRH...L, DCDBTRH..L |
| New |  | Process Control<br>"CID"<br><br>Interrupt Processing<br>EIDR, IEAR, SRR 2..3,<br>CSEE 2..3, MCSRR2..3 | Process Control<br>CTXIDX, CTXH[0..255],<br>CTXLO [0..255]<br><br>Interrupt Processing<br>IVOR16, ICID0..16 |
|  | Tagged Context State (CID) | (PPC 440x6) | Untagged Processor State |

FIG. 16

PROCESSOR AND DATA PROCESSING METHOD WITH NON-HIERARCHICAL COMPUTER SECURITY ENHANCEMENTS FOR CONTEXT STATES

BACKGROUND

1. Field of the Invention

The present disclosure relates to data processors and more specifically, to embodiments of a data processor and data processing method that provide non-hierarchical computer security enhancements for context states.

2. Description of the Related Art

The need to provide enhanced computer security has increased exponentially in recent years. For purposes of this disclosure, computer security (also referred to as information security) refers to measures used to prevent unauthorized access to and/or corruption of a computer system and the data stored within that system, while allowing authorized access and/or use. That is, computer security refers to measures designed to protect the integrity, secrecy, and availability of a computer system and the data stored within the computer system from unauthorized access and/or use. Such measures are typically implemented in both hardware (e.g., protected memory in which page tables define the allowed access for a context to a given page of memory) and software (e.g., operating system software or software mandatory access control systems, which may include mathematical models for secrecy protection and integrity protection). Unfortunately, there are significant limitations associated with existing hardware-based and software-based computer security.

SUMMARY

In view of the foregoing, disclosed herein are embodiments of a data processor that provides non-hierarchical computer security enhancements for context states. Specifically, in the data processor embodiments, a context control unit uses context identifier tags associated with corresponding contexts (i.e., threads of execution) to control access by the contexts (i.e., by the threads of execution) to context information (i.e., context states of the threads of execution) contained in the processor's registers (e.g., non-stackable and/or stackable registers). For example, in response to an access request, the context control unit can grant a specific context read and write access to a register only when that register is tagged with a specific context identifier tag. If the register is tagged with another context identifier tag, the contents of the specific register are saved in a context save area of memory and the previous context states of the specific context are restored to the specific register before read and write access can be granted. In other data processor embodiments, the context control unit can provide the computer security enhancements while still facilitating authorized cross-context and/or cross-level communications. Also disclosed herein are associated data processing method embodiments.

Specifically, disclosed herein are embodiments of a data processor that provides non-hierarchical computer security enhancements for context states. The data processor can comprise one or more registers (e.g., program registers, such as a general purpose register and a floating-point register, and/or branch registers, such as a link register, a count register and a condition register) and each register can be adapted to store context information (i.e., context states) of a context. The data processor can further comprise a context control unit that can use context identifier tags associated with corresponding contexts to control access by the contexts to the register(s) and, thereby access to the context information (i.e., the context states) contained therein.

Other embodiments of the data processor can incorporate one or more stackable registers and, in this case, the context control unit can use both context identifier tags and stack level tags associated with corresponding contexts to control access by the contexts to the stackable register(s).

Yet other embodiments of the data processor can provide the computer security enhancements described in the embodiments above while still facilitating authorized cross-context communications and/or cross-level communications. Specifically, the data processor can comprise first registers and second registers. The first registers can contain first context information (i.e., first states of a first context) and can be tagged with a first context identifier tag associated with the first context in a first context descriptor in a context control table (i.e., in a first table entry of a context control table). The second registers can contain second context information (i.e., second states of a second context) and can be tagged with second context identifier tag associated with the second context in a second context descriptor in the context control table (i.e., in a second table entry in a context control table). In this case, the context control unit can use the context identifier tags to control access by the contexts to the registers, as discussed in the data processor embodiments above. Additionally, the context control unit can control across-context communications (i.e., can control the passing of the first context information in any of the first registers to the second context and the passing of the second context information in any of the second registers back to the first context) based on instructions received from both the first context and the second context and on the second context descriptor. It should be noted that if any of the registers comprise a stackable register, the context control unit can use such instructions to similarly control cross-level communications.

Also disclosed herein are embodiments of a data processing method incorporating non-hierarchical security enhancements for context states. The method embodiments can comprise providing a data processor having one or more registers (e.g., program registers, such as a general purpose register and a floating-point register, and/or branch registers, such as a link register, a count register and a condition register), where each register is adapted to store context information (i.e., context states) of a context. The data processor can further comprise a context control unit and the method embodiments can comprise using, by the context control unit, context identifier tags associated with corresponding contexts to control access by the contexts to the register(s) and, thereby to the context information (i.e., the context states) contained therein.

Other embodiments of the data processing method can incorporate one or more stackable registers and, in this case, both context identifier tags and stack level tags associated with corresponding contexts can be used to control access by the contexts to the stackable register(s) in a similar manner to that described in the above data processing method embodiments.

Yet other embodiments of the data processing method can provide the computer security enhancements described in the embodiments above while still facilitating authorized cross-context communications and/or cross-level communications.

BRIEF DESCRIPTION OF THE DRAWINGS

The embodiments herein will be better understood from the following detailed description with reference to the drawings, which are not necessarily drawn to scale and in which:

FIG. 3B is a flow diagram illustrating a cross-context call operation performed by the data processor of FIG. 3A;

FIG. 3C is a flow diagram illustrating a cross-context return operation performed by the data processor of FIG. 3A;

FIG. 16 is a table illustrating how the internal registers and state of an exemplary data processor are modified in accordance with the embodiments disclosed herein.

DETAILED DESCRIPTION

Figure 1:
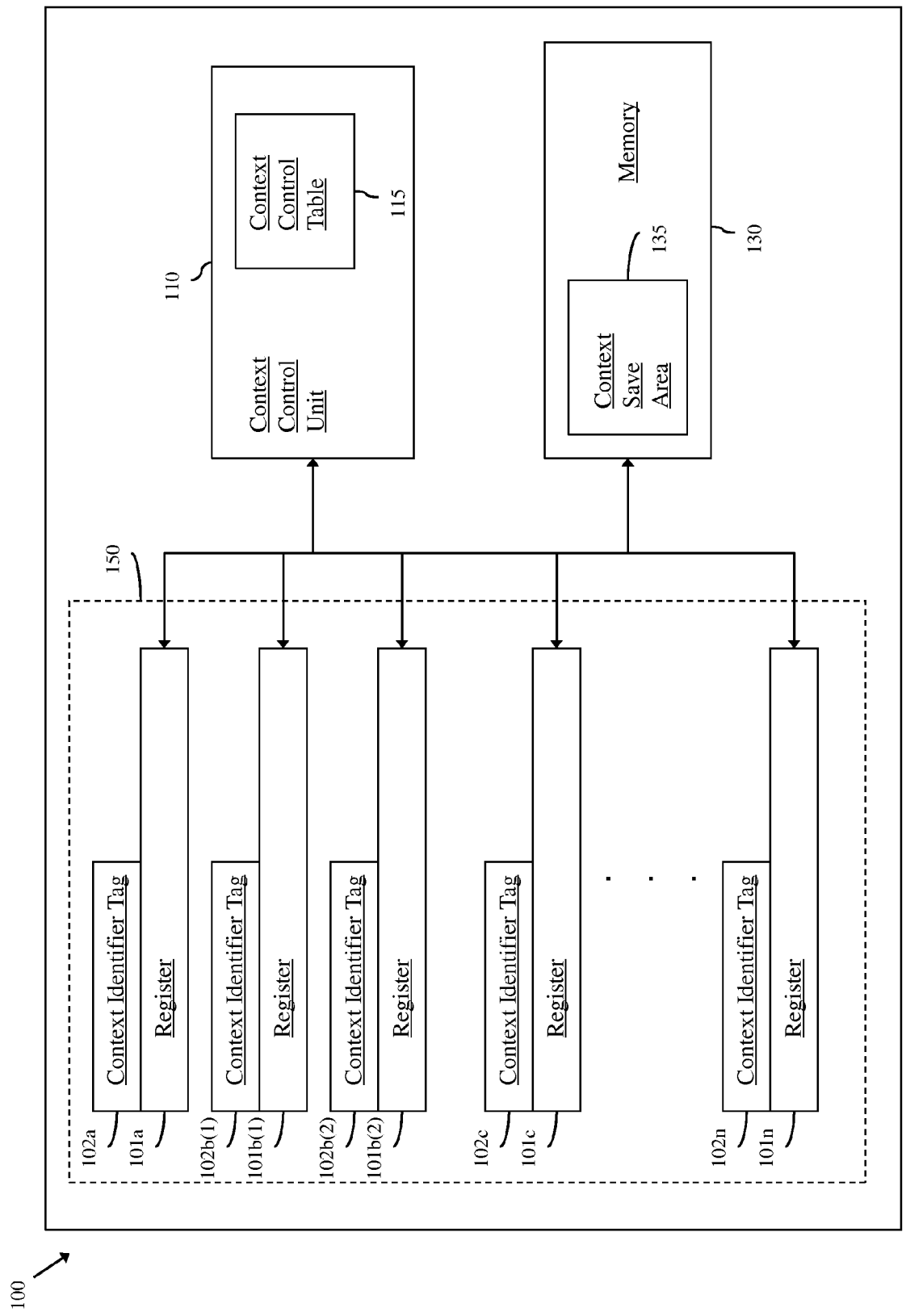
FIG. 1 is a schematic diagram illustrating an embodiment of a data processor.

As mentioned above, the need to provide enhanced computer security has increased exponentially in recent years. For purposes of this disclosure, computer security (also referred to as information security) refers to measures used to prevent unauthorized access to and/or corruption of a computer system and the data stored within that system, while allowing authorized access and/or use. That is, computer security refers to measures designed to protect the integrity, secrecy, and availability of a computer system and the data stored within the computer system from unauthorized access and/or use. Such measures are typically implemented in both hardware (e.g., protected memory in which page tables define the allowed access for a context to a given page of memory) and software (e.g., operating system software or software mandatory access control systems, which may include mathematical models for secrecy protection and integrity protection). Unfortunately, there are significant limitations associated with existing hardware-based and software-based computer security.

For example, with typical hardware-based protected memory, access to the data is controlled when the data stored is in memory. However, once that data is loaded into registers within a processor, access is no longer controlled by the hardware but rather by the operating system software. Thus, from that point on, computer security depends upon the accuracy of the operating system software.

Furthermore, software-based computer security is dependent on the accuracy of the implementation of the applications, of the operating system and of the hypervisor, if present. Since these features typically have many millions of lines of code, ensuring that all of this code is correct under all conditions is extremely difficult (i.e., effectively impossible). Additionally, software-based security is typically implemented with an implied hierarchy of trust. That is, the applications trust the operating system that created their processes and operating systems trust the virtualization mechanism that created their virtual machines. Therefore, the virtualization mechanisms and operating system are provided with unlimited access to the context states contained in processor registers and/or memory. This unlimited access is not necessary, but is rather the result of the historical evolution of the processor and virtualization architectures. For example, software saves and loads registers to switch contexts and software constructs page tables used by hardware to control memory access. While some parts of the system must be trusted by all software running on the hardware, it would be advantageous to provide a data processor and data processing method that provide enhanced computer security and, particularly, non-hierarchical computer security enhancements through the implementation of hardware support for separation.

In view of the foregoing, disclosed herein are embodiments of a data processor that provides non-hierarchical computer security enhancements for context states. Specifically, in the data processor embodiments, a context control unit uses context identifier tags associated with corresponding contexts (i.e., threads of execution) to control access by the contexts (i.e., by the threads of execution) to context information (i.e., context states of the threads of execution) contained in the processor's registers (e.g., non-stackable and/or stackable registers). For example, in response to an access request, the context control unit can grant a specific context read and write access to a register only when that register is tagged with a specific context identifier tag. If the register is tagged with another context identifier tag, the contents of the specific register are saved in a context save area of memory and the previous context states of the specific context are restored to the specific register before read and write access can be granted. In other data processor embodiments, the context control unit can provide the computer security enhancements while still facilitating authorized cross-context and/or cross-level communications. Also disclosed herein are associated data processing method embodiments.

Specifically, referring to FIG. 1, disclosed herein are embodiments of a data processor 100 (i.e., a microprocessor, a computer processing unit (CPU), etc.) that provides non-hierarchical computer security enhancements for context states. The data processor 100 can comprise at least one or more registers 101a-n, a context control unit 110 and a memory 130. Each of these registers 101a-n can be adapted to store context information (i.e., context states) of a context (i.e., of a thread of execution). For the most part, each of these registers 101a-n can be temporarily tagged with a context identifier tag (see tags 102a-n) of a fixed length (e.g., 8-bits). Each context identifier tag 102a-n can be associated in a context control table 115 (e.g., in the context control unit 110) with a particular context (i.e., a particular thread of execution)

that is currently in operation and using that register. Tagged registers can comprise, for example, program registers, such as a general purpose register and a floating-point register, and/or branch registers, such as a link register, a count register and a condition register. It should be noted that some registers should, however, remain untagged. Untagged registers can, for example, include registers for the timer/clock, for debug control, for storage control, and for process control. The context control unit 110 can be operatively connected to the registers and can use the context identifier tags 102a-n associated with the corresponding contexts (i.e., corresponding threads of execution) to control access by the contexts (i.e., by the threads of execution) to the register(s) 101a-n and, thereby to control access to the context information (i.e., the context states of the threads of execution) contained therein.

For example, in one embodiment of the data processor 100, the context control unit 110 can receive, from a first context (i.e., from a first thread of execution), an access request for a specific register (e.g., register 101a). In response, the context control unit 110 can then determine whether the specific register 101a is tagged with a first context identifier tag associated with the first context. That is, the context control unit can determine whether the context identifier tag 102a on the specific register is the first context identifier tag associated in the context control table 115 with the first context, thereby indicating that the contents of the specific register 101a (i.e., that the states saved in the specific register 101a) are owned by the first context. When the specific register 101a is tagged with the first context identifier tag (i.e., when context identifier tag 102a is the first context identifier tag), the context control unit 110 can provide the first context with read and write access to the specific register 101a. For purposes of this disclosure, read and write access of a context to a register means allowing the context to see, modify and/or write-over states saved in the register.

However, when the specific register 101a is tagged with a second context identifier tag associated with a second context (i.e., when the context identifier tag 102a does not match the first context identifier tag but instead is a second context identifier tag, thereby indicating that a second context owns the contents of the specific registers 101a)), the context control unit 110 can use the second context identifier tag to save, in a context save area 135 of the memory 130, all second context information (i.e., all second states of the second context) from the specific register 101a. It should be noted that the specific save location (i.e., the memory address) for the second context information of the second context within the context save area 135 can be specified in the context control table 115 (as indexed by the second context identifier) and this specific save location can be addressable only by a more privileged, trusted, context that has been given control of memory management. The context control unit 110 can then use the first context identifier tag to restore, to the specific register 101a, first context information (i.e., previously saved first states of the first context) from another location in the context save area 135, as specified in the context control table 115 and the specific register 101a can be retagged with first context identifier tag (i.e., the context identifier tag 102a can be switched from the second context identifier tag associated with the second context to the first context identifier tag associated with the first context). Only then can the context control unit 110 provide the first context with read and write access to the specific register 101a.

As mentioned above, when the specific register 101a is tagged with a second context identifier tag associated with a second context (i.e., when the context identifier tag 102a does not match the first context identifier tag but instead is a second context identifier tag), the context control unit 110 can use the second context identifier tag to save, in a context save area 135 of the memory 130, all second context information (i.e., second states of the second context) from the specific register 101a. Saving all the second context information prior to providing the first context with access to the specific register 101a can be time consuming. Therefore, alternatively, the second context information (i.e., of second states of the second context) can be saved "on demand" (i.e., only when those second states are referenced by the first context) or a portion of the second context information (e.g., selected second states) can be saved initially and the remainder can be saved "on demand".

In another embodiment, the data processor 100 can comprise multiple copies of a specific register (see copies (1) and (2) of specific register 101b and can receive, from a first context, an access request for that specific register 101b. In this case, the context control unit 110 can first determine whether any of the copies (1) or (2) of the specific register 101b is tagged with a first context identifier tag associated with the first context. That is, the context control unit 110 can determine whether the context identifier tag 102b(1) or 102b (2) on any of the copies (1) or (2), respectively, of the specific register 101b is the first context identifier tag associated in the context control table 115 with the first context. When at least one of the copies of the specific register is tagged with the first context identifier tag, the context control unit 110 can select a first copy (e.g., copy (1) of specific register 101b) tagged with the first context identifier tag and can provide the first context with read and write access to that first copy 101b(1).

However, when none of the copies (1) or (2) of the specific register 101b is tagged with the first context identifier tag, the context control unit 110 can select one of the copies of the specific register (e.g., a second copy (2) of the specific register 101(b), which is tagged with a second context identifier tag associated with a second context). Then, the context control unit 110 can use the second context identifier tag to save, in the context save area 135 of the memory 130, all second context information (i.e., all second states of the second context) from the second copy. As in the previously described embodiment, the specific save location (i.e., the memory address) for the second context information of the second context within the context save area 135 can be specified in the context control table 115 (as indexed by the second context identifier) and this specific save location can be addressable only by a more privileged, trusted, context that has been given control of memory management. Next, the context control unit 110 can use the first context identifier tag to restore first context information (i.e., previously stored first states of the first context) from another location in the context save area 135, as specified in the context control table 115, to the second copy (2) of specific register 101b and the second copy (2) of the specific register 101b can be retagged with first context identifier tag (i.e., the context identifier tag 102b(2) can be switched from the second context identifier tag associated with the second context to the first context identifier tag associated with the first context). Only then can the context control unit 110 provide the first context with read and write access to the second copy (2) of the specific register 101b.

As mentioned above, when the second copy (2) of the specific register 101b is tagged with a second context identifier tag associated with a second context, the context control unit 110 can use the second context identifier tag to save, in a context save area 135 of the memory 130, all second context information (i.e., second states of the second context) from the second copy (2) of the specific register 101b. Saving all the second context information prior to providing the first context with access can be time consuming. Therefore, alternatively, the second context information (i.e., of second states of the second context) can be saved "on demand" (i.e., only when those second states are referenced by the first context) or a portion of the second context information (e.g., selected second states) can be saved initially and the remainder can be saved "on demand".

In yet another embodiment, the data processor 100 can further comprise a pool 150 of registers. In this case, there may be more registers in the pool 150 than are required for operation of all of the contexts (i.e., some of the registers may be free or, more particularly, empty). The context control unit 110 can receive, from a first context, an access request indicating a first register name. In this case, the context control unit 110 can first determine whether any register in the pool 150 has the first register name and is tagged with a first context identifier tag associated with the first context. When a first register (e.g., register 101*a*) in the pool has the first register name and is tagged with the first context identifier tag (i.e., when the context identifier tag 102*a* matches the first identifier tag of the first context), the context control unit 110 can provide the first context with read and write access to the first register 101*a*. However, when none of the registers in the pool 150 has the first register name and is tagged with the first context identifier tag, the context control unit 110 can select a free register (e.g., 101*b*), if present, can use the first context identifier tag to restore first context information from the context save area 135 to the selected register 101*n*, and can provide the first context with access to that free register 101*b*. When none of the registers in the pool 150 has the first register name and is tagged with the first context identifier tag and when none of the registers in the pool 150 is free, the context control unit 110 can select a selected register (e.g., register 101*n*) from the pool and, particularly, a selected register that has a different register name and that is tagged with a different context identifier tag associated with a second context. Then, the context control unit 110 can then use the different context identifier tag to save, in the context save area 135 of the memory 130, any context information from the selected register 101*n*. Next, the context control unit 110 can rename the selected register 101*n* with the first register name and can retag the selected register 101*n* with the first context identifier tag (i.e., can change the context identifier tag 102*n* from the different context identifier tag to the first context identifier tag). Then, the context control unit 110 can use the first context identifier tag to restore first context information from the context save area 135 to the selected register 101*n* and can provide the first context with read and write access to the selected register 101*n*, in the same manner as in the embodiments described above.

Figure 2:
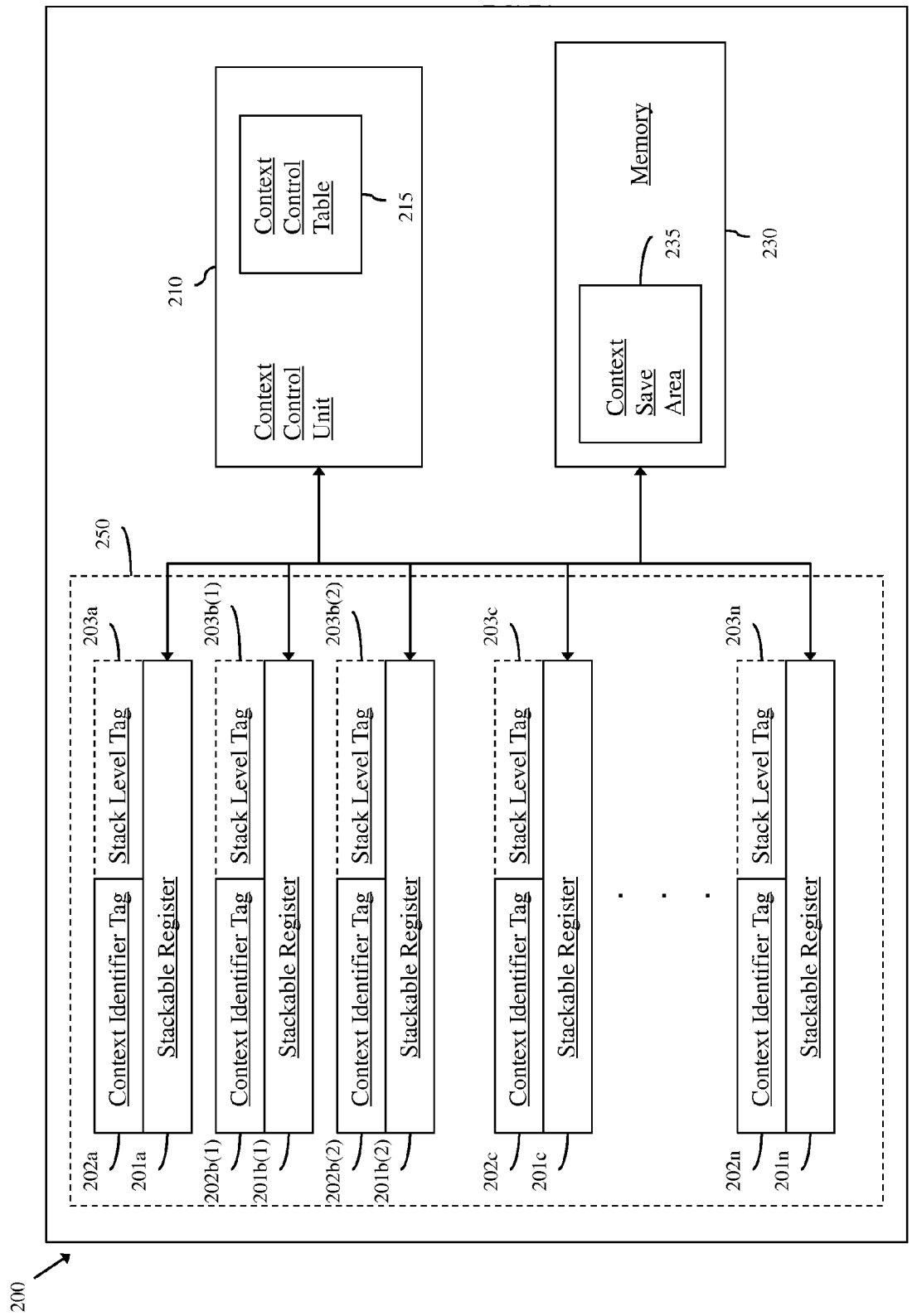
FIG. 2 is a schematic diagram illustrating another embodiment of a data processor.

Referring to FIG. 2, also disclosed are embodiments of a data processor 200 (i.e., a microprocessor, a computer processing unit (CPU, etc.) that comprises at least one or more stackable registers 201*a-n*, a context control unit 210 and a memory 230. Each of these stackable registers 201*a-n* can be adapted to store context information (i.e., context states) of a context (i.e., of a thread of execution). For the most part, each of these stackable registers 201*a-n* can be temporarily tagged with a context identifier tag (see tags 202*a-n*) of a fixed length (e.g., 8-bits). Each context identifier tag 202*a-n* can be associated in a context control table 215 (e.g., in the context control unit 210) with a particular context (i.e., a particular thread of execution) that is currently in operation and using that register. Tagged registers can comprise, for example, program registers, such as a general purpose register and a floating-point register, and/or branch registers, such as a link register, a count register and a condition register. It should be noted that some registers should, however, remain untagged. Untagged registers can, for example, include registers for the timer/clock, for debug control, for storage control, and for process control. The tagged registers can further be tagged with stack level tags 203*a-n* associated the corresponding contexts.

In this case, the context control unit 210 can use both context identifier tags 202*a-n* and stack level tags 203*a-n* associated with corresponding contexts (i.e., corresponding threads of execution) to control access by the contexts (i.e., by the threads of execution) to the stackable register(s) 201*a-n* in a similar manner to that described in the data processor embodiments above.

For example, in one embodiment of the data processor 200, the context control unit 210 can receive, from a first context (i.e., from a first thread of execution), an access request for a specific stack level of a specific stackable register (e.g., stackable register 201*a*). In response, the context control unit 210 can then determine whether the specific register 201*a* is tagged with a first context identifier tag and a first stack level tag associated with the first context. That is, the context control unit 210 can determine whether the context identifier tag 202*a* and stack level tag 203*a* on the specific stackable register are the same as the first context identifier tag and first stack level tag associated in the context control table 215 with the first context. When the specific stackable register 201*a* is tagged with the first context identifier tag and first stack level tag (i.e., when context identifier tag 202*a* and stack level tag 203*a* are the first context identifier tag and first stack level tag, thereby indicating that the specific stack level of the specific register is owned by the first context), the context control unit 210 can provide the first context with read and write access to the specific stackable register 201*a*.

However, when the specific stackable register 201*a* is tagged with a second context identifier tag and/or a second stack level associated with a second context and/or different stack level (i.e., when the context identifier tag 202*a* and/or the stack level tag 203*a* do not match the first context identifier tag and first stack level), the context control unit 210 can use the context identifier tag and stack level tag on the specific stackable register (e.g., the second context identifier tag and second stack level tag) to save, in a context save area 235 of the memory 230, all second context information (i.e., all second states of the second context) from the specific register 201*a*. It should be noted that the specific save location (i.e., the memory address) for the second context information of the second context within the context save area 235 can be specified in the context control table 215 (as indexed by the second context identifier tag and second stack level tag) and this specific save location can be addressable only by a more privileged, trusted, context that has been given control of memory management. The context control unit 210 can then use the first context identifier tag and first stack level tag to restore, to the specific register 201*a*, first context information (i.e., previously saved first states of the first context) from another location in the context save area 235, as specified in the context control table 215 and the specific register 201*a* can be retagged with first context identifier tag (i.e., the context identifier tag 202*a* can be switched from the second context identifier tag associated with the second context to the first context identifier tag associated with the first context) and first stack level tag. Only then can the context control unit 210 provide the first context with read and write access to the specific stackable register 201*a*.

As mentioned above, when the specific stackable register 201*a* is tagged with a second context identifier tag and a second stack level tag each associated with a second context (i.e., when the context identifier tag 202a and/or stack level tag 203a do not match the first context identifier tag and first stack level tag), the context control unit 210 can use the second context identifier tag and second stack level tag to save, in a context save area 235 of the memory 230, all second context information (i.e., second states of the second context) from the specific stackable register 201a. Saving all the second context information prior to providing the first context with access to the specific stackable register 201a can be time consuming. Therefore, alternatively, the second context information (i.e., of second states of the second context) can be saved "on demand" (i.e., only when those second states are referenced by the first context) or a portion of the second context information (e.g., selected second states) can be saved initially and the remainder can be saved "on demand".

In another embodiment, the data processor 200 can comprise multiple copies of a specific stackable register (see copies (1) and (2) of specific stackable register 201b and can receive, from a first context, an access request for that specific stackable register 201b. In this case, the context control unit 210 can first determine whether any of the copies (1) or (2) of the specific stackable register 201b is tagged with a first context identifier tag and first stack level tag associated with the first context. That is, the context control unit 210 can determine whether the context identifier tag 202b(1) or 202b(2) as well as the stack level tags 203b(1) or 203b(2) on any of the copies (1) or (2), respectively, of the specific stackable register 201b match both the first context identifier tag and first stack level tag associated in the context control table 215 with the first context. When at least one of the copies of the specific stackable register is tagged with the first context identifier tag and first stack level tag, the context control unit 210 can select a first copy (e.g., copy (1) of specific stackable register 201(b) tagged with the first context identifier tag/first stack level tag and can provide the first context with read and write access to that first copy 201b(1).

However, when none of the copies (1) or (2) of the specific stackable register 201b is tagged with the first context identifier tag and first stack level tag, the context control unit 210 can select one of the copies of the specific stackable register (e.g., a second copy (2) of the specific register 201(b), which is tagged with a second context identifier tag and/or second stack level associated with a second context). Then, the context control unit 210 can use the second context identifier tag and second stack level tag to save, in the context save area 235 of the memory 230, all second context information (i.e., all second states of the second context) from the second copy. As in the previously described embodiment, the specific save location (i.e., the memory address) for the second context information of the second context within the context save area 235 can be specified in the context control table 215 (as indexed by the second context identifier and stack level tags) and this specific save location can be addressable only by a more privileged, trusted, context that has been given control of memory management. Next, the context control unit 210 can use the first context identifier tag and first stack level tag to restore first context information (i.e., previously stored first states of the first context) from another location in the context save area 235, as specified in the context control table 215, to the second copy (2) of specific stackable register 201b and the second copy (2) of the specific stackable register 201b can be retagged with first context identifier and stack level tags (i.e., the context identifier tag 202b(2) and stack level tag 203b(2) can be switched to the first context identifier tag and first stack level tag, respectively). Only then can the context control unit 210 provide the first context with read and write access to the second copy (2) of the specific register 201b.

As mentioned above, when the second copy (2) of the specific stackable register 201b is tagged with a second context identifier and/or stack level tags, the context control unit 210 can use the second context identifier and stack level tags to save, in a context save area 235 of the memory 230, all second context information (i.e., second states of the second context) from the second copy (2) of the specific stackable register 201b. Saving all the second context information prior to providing the first context with access can be time consuming. Therefore, alternatively, the second context information (i.e., of second states of the second context) can be saved "on demand" (i.e., only when those second states are referenced by the first context) or a portion of the second context information (e.g., selected second states) can be saved initially and the remainder can be saved "on demand".

In yet another embodiment, the data processor 200 can further comprise a pool 250 of stackable registers. In this case, there may be more stackable registers in the pool 250 than are required for operation of all of the contexts (i.e., some of the registers may be free or, more particularly, empty). The context control unit 210 can receive, from a first context, an access request indicating a first register name. In this case, the context control unit 210 can first determine whether any register in the pool 250 has the first register name and is tagged with a first context identifier and first stack level tags associated with the first context. When a first stackable register (e.g., stackable register 201a) in the pool 250 has the first register name and is tagged with the first context identifier and stack level tags (i.e., when the context identifier tag 202a and stack level tag 203a match the first identifier tag and first stack level tag, respectively, of the first context), the context control unit 210 can provide the first context with read and write access to the first stackable register 201a. However, when none of the registers in the pool 250 has the first register name and is tagged with both the first context identifier and stack level tags, the context control unit 210 can select a free register (e.g., 201b), if present, can use the first context identifier and stack level tags to restore first context information from the context save area 235 to the free selected stackable register 201b, and can provide the first context with access to that that free stackable register 201b. When none of the stackable registers in the pool 250 has the first register name and is tagged with the first context identifier and stack level tags and when none of the stackable registers in the pool 250 is free, the context control unit 210 can select a selected stackable register (e.g., stackable register 201n) from the pool 250 and, particularly, a selected register that has a different register name and that is tagged with different context identifier and/or stack level tags associated with a second context. Then, the context control unit 210 can then use the different context identifier and stack level tags to save, in the context save area 235 of the memory 230, any context information from the selected register 201n. Next, the context control unit 210 can rename the selected register 201n with the first register name and can retag the selected register 101n with the first context identifier and first stack level tags (i.e., can change the context identifier tag 202n and stack level tag 203n to the first context identifier tag and first stack level tag, respectively). Then, the context control unit 210 can use the first context identifier and stack level tags to restore first context information from the context save area 235 to the selected stackable register 201n and can provide the first context with read and write access to the selected stackable register 201n, in the same manner as in the embodiments described above.

Yet other embodiments of the data processor can provide the computer security enhancements described in the embodiments above while still facilitating authorized cross-context communications and/or cross-level communications. Specifically, referring to FIG. 3, also disclosed herein are embodiments of a data processor 300 (i.e., a microprocessor, a computer processing unit (CPU, etc.) that comprises at least first registers 311a-311n, second registers 321a-m, a context control unit 310 and a memory 330.

These registers 311a-n and 321a-m can be non-stackable or stackable registers and each can be adapted to store context information (i.e., context states) of a context (i.e., of a thread of execution). For the most part, each of these registers can be temporarily tagged with a context identifier tag (see the context identifier tags 312a-n of the first registers 311a-n and the context identifier tags 322a-m of the second registers 321a-m) of a fixed length (e.g., 8-bits). The first context identifier tags 312a-n can be associated in a first context descriptor (i.e., a first context entry) in a context control table 315 (e.g., in the context control unit 310) with a first context (i.e., a first thread of execution) that is currently in operation and using the registers 311a-n and the second context identifier tags 322a-m can be associated in a second context descriptor (i.e., a second context entry) in the context control table 315 (e.g., in the context control unit 310) with a second context (i.e., a second thread of execution) that is currently in operation and using the registers 321a-m.

It should be noted that each entry for each context in the context control table 315 is referred to herein as a context descriptor. Thus, the first context has a first context descriptor (i.e., a first context entry) in the context control table 315, the second context has a second context descriptor (i.e., a second context entry) in the context control table 315, etc. As discussed in greater detail below with regard to FIG. 6, each context descriptor can contain information specific to that context including, for example, a security domain identifier (SDID), a supervisor-only constraint bit, a persistent context bit, a maximum context stack level tag, a current context stack level tag, a physical address in memory, and an acceptable number of cross-context call registers.

These tagged registers can comprise, for example, program registers, such as a general purpose register and a floating-point register, and/or branch registers, such as a link register, a count register and a condition register. It should be noted that some registers should, however, remain untagged. Untagged registers can, for example, include registers for the timer/clock, for debug control, for storage control, and for process control. If the registers 311a-n and 321a-m are stackable registers they can each further be tagged with corresponding stack level tags 313a-n and 323a-m associated with the first and second contexts, respectively. The first registers 311a-n can contain first context information (i.e., first states of a first context) and the second registers 321a-m can contain second context information (i.e., second states of a second context).

In this case, the context control unit 310 can use the context identifier tags 312a-n, 322a-m (and, if applicable, the stack level tags 313a-n, 323a-m) to control access by the contexts to the registers, as discussed in the data processor embodiments above. Additionally, the context control unit 310 can control cross-context communications (i.e., can control the passing of the first context information in any of the first registers 311a-n to the second context and the passing of the second context information in any of the second registers 321a-m back to the first context) based on instructions received from both the first context and the second context and based on the second context descriptor.

For example, a cross-context call instruction received by the context control unit 310 from the first context (i.e., the caller context) specifies a set of registers and, particularly, the number of the first registers 311a-n to be passed from the first context to the second context and further specifies another set of registers and, particularly, the number of second registers 321a-n of the second context (i.e., the callee context)) to be accepted from the second context to the first context. Additionally, a cross-context return instruction received by the context control unit 310 from the second context specifies a set of registers and, particularly, the number of the second registers 321a-m to be returned from the second context to the first context. For a cross-context call, the context control unit 310 copies, into the second context's registers 321a-m, the first context information from the lesser of the number of the first context's registers 311a-n to be passed specified in the cross-context call instruction and the number of first context's registers 311a-n to be accepted as specified in the second context's context descriptor so as to provide the second context with read and write access to information copied from the first context. For a cross context return, the context control unit 310 copies, into the first context's registers 311a-n, the second context information from the lesser of the number of the second context's registers 321a-m to be returned specified in the second context's cross context return instructions and the number of the registers 321a-m of the second context to be accepted specified in the first context's cross-context call instruction so as to provided the first context with read and write access to information copied from the second context.

Figure 3A:
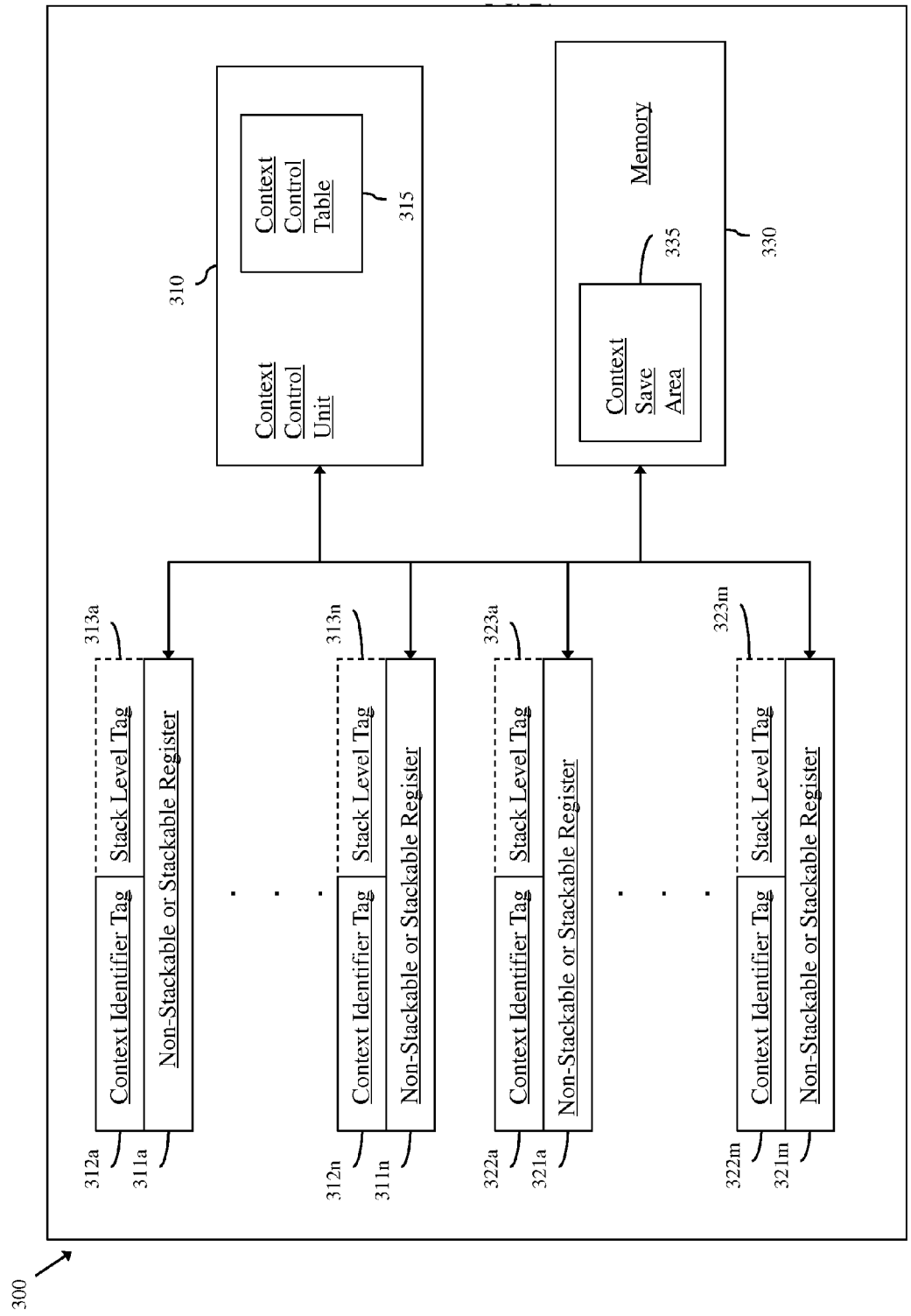
FIG. 3A is a schematic diagram illustrating yet another embodiment of a data processor.

The context control unit processing the cross-context call and cross-context return instructions can be better understood with reference to the flow diagrams of FIGS. 3B and 3C. Briefly four sets of registers are defined, two sets specified by the caller and two sets specified by the callee. The caller specifies a set of registers to be passed to the callee and a set of registers to be accepted back from the callee in the cross-context call instruction. The callee defines a set of registers to be accepted from the caller in the callee context descriptor and a set of registers to be returned to the caller in the cross context return instruction. The context control unit determines the common subset that will be passed from the caller to the callee during the cross context call. The context control unit determines the common subset that will be returned from the callee to the caller during the cross context return. Any mechanism known to the art can be used to define and determine the common subset. For instance register sets can be implemented as a collection of named registers and the common subset is the set intersection. In our preferred embodiment the registers are considered ordered and the set of registers is a count of registers from a specific starting register in the order. Therefore any of the four sets of registers previously mentioned can be represented as a number or a count and the common subset is defined as the lesser of the two numbers. Those skilled in the art can define other representations of register sets and other ways to determine a common subset.

Thus, as shown in FIG. 3B, a cross-context call instruction begins in the caller (381). The context control unit 310 gets the caller set of registers to be passed (382) and also gets the callee set of registers to be accepted (383). It then determines the common subset of registers between caller and callee (384) and copies the common subset of registers from the caller to the callee (385). Then, execution can continue at the entry point in the callee (386). Similarly, as shown in FIG. 3C, a cross-context return instruction begins in the callee (391). The context control unit gets the callee set of registers to be returned (392) and gets the caller set of registers to be accepted (393). It then determines the common subset of registers between the caller and callee (394) and copies the common subset of registers from the callee to the caller (395). Then, execution can continue at the return point in the caller (396).

It should be noted that if any of the registers 311a-n, 321a-m comprise stackable registers, the context control unit 310 can use instructions to similarly control cross-level communications.

Figure 4:
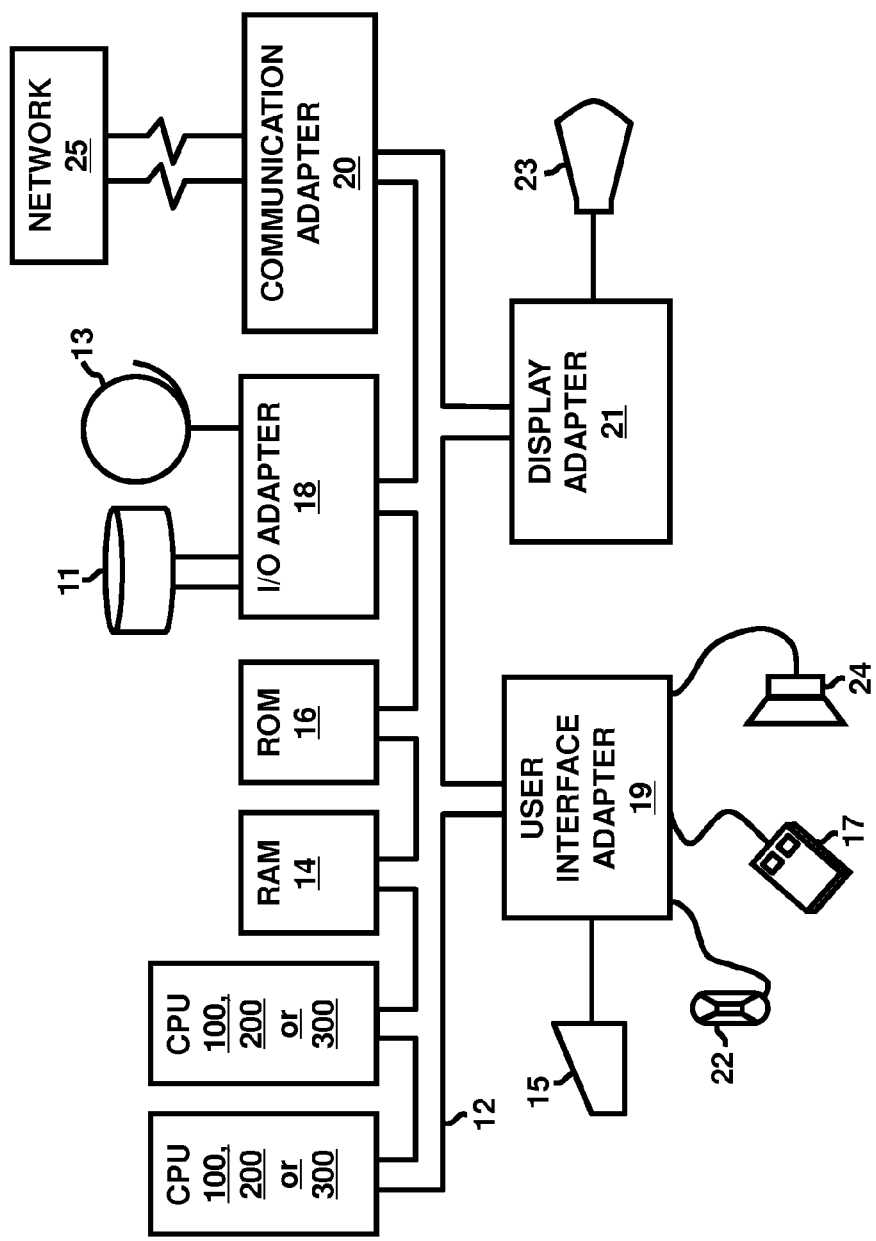
FIG. 4 is a schematic diagram illustrating an exemplary hardware environment that can incorporate any of the data processors of FIG. 1, 2 or 3.

The data processors 100, 200, 300 described above and illustrated in FIGS. 1, 2 and 3 can be incorporated a hardware environment and, particularly, a computer system, such as that depicted in FIG. 4. This computer system comprises at least one data processor or central processing unit (CPU), such as the data processor 100 of FIG. 1, 200 of FIG. 2 or 300 of FIG. 3. The data processors 100, 200, or 300 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the disclosed embodiments. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example. Alternatively, the data processors 100, 200, 300 described above and illustrated in FIGS. 1, 2 and 3 can be incorporated into any other computerized device requiring data processing capability (e.g., a laptop computer, tablet computer, handheld device, smart phone, server, etc.).

Those skilled in the art will recognize that data processors (i.e., microprocessors or computer processing units (CPUs)) typically comprise a variety of other components including, but not limited to, a branch processing unit, a load and store units, execute units (e.g., integer and floating point units), an instruction buffer, a data memory management unit (DMMU) and an instruction memory management unit (IMMU), a data cache, etc. Such components are well known in the art and, thus, the details are omitted from this specification in order to allow the reader to focus on the salient aspects of the invention. However, it should be noted that additional details of the embodiments are set forth below and the discussion with respect to FIGS. 11 and 12 indicates how the novel context control unit of the disclosed embodiments interacts with such components when incorporated into an exemplary data processor, such as a PowerPC 440.

Figure 5A:
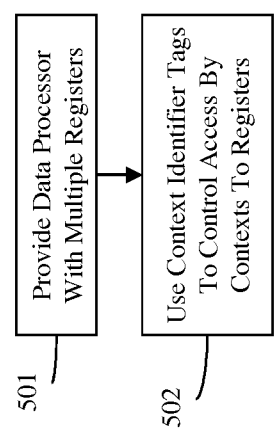
FIG. 5A-5D are flow diagram illustrating embodiments of a data processing method.

Referring to FIG. 5A, disclosed herein are embodiments of a data processing method that provides non-hierarchical computer security enhancements for context states. The data processing method can comprise providing a data processor, such as the data processor 100 described in detail above and illustrated in FIG. 1 (501). The method embodiments can further comprise using, by the context control unit 110, the context identifier tags 102a-n associated with the corresponding contexts (i.e., corresponding threads of execution) to control access by the contexts (i.e., by the threads of execution) to the register(s) 101a-n and, thereby to control access to the context information (i.e., the context states of the threads of execution) contained therein (502).

Figure 5B:
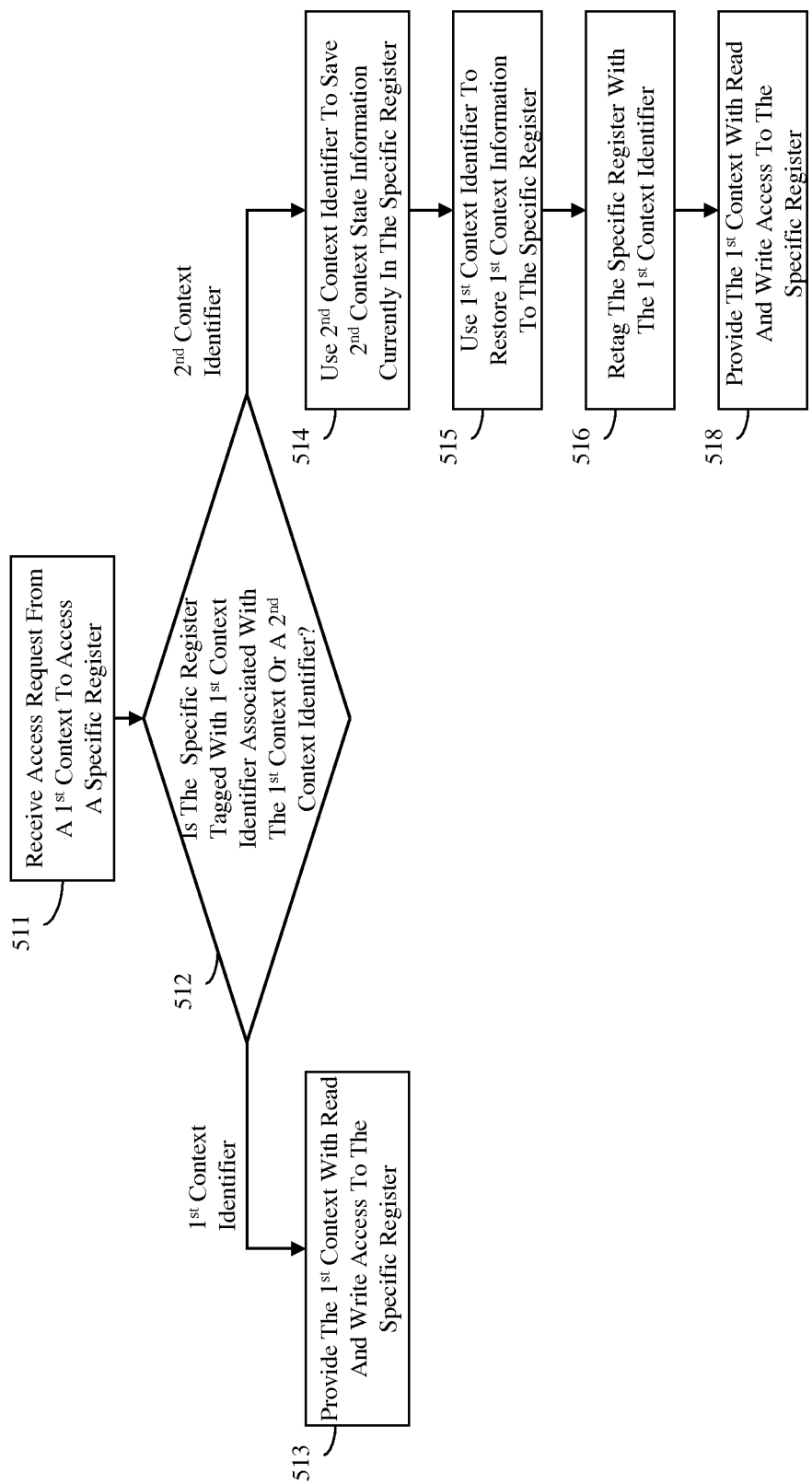

For example, referring to FIG. 5b the process 502 can comprise receiving from a first context (i.e., from a first thread of execution), an access request for a specific register (e.g., register 101a) (511). In response, a determination can be made as to whether the specific register 101a is tagged with a first context identifier tag associated with the first context (512). That is, the context control unit can determine whether the context identifier tag 102a on the specific register is the first context identifier tag associated in the context control table 115 with the first context. When the specific register 101a is tagged with the first context identifier tag (i.e., when context identifier tag 102a is the first context identifier tag), the first context can be provided with read and write access to the specific register 101a (513). For purposes of this disclosure, read and write access of a context to a register means allowing the context to see, modify and/or write-over states saved in the register.

However, when the specific register 101a is tagged with a second context identifier tag associated with a second context (i.e., when the context identifier tag 102a does not match the first context identifier tag but instead is a second context identifier tag), the second context identifier tag can be used to save, in a context save area 135 of the memory 130, all second context information (i.e., all second states of the second context) from the specific register 101a (514). It should be noted that the specific save location (i.e., the memory address) for the second context information of the second context within the context save area 135 can be specified in the context control table 115 (as indexed by the second context identifier) and this specific save location can be addressable only by a more privileged, trusted, context that has been given control of memory management. Then, the first context identifier tag can be used to restore, to the specific register 101a, first context information (i.e., previously saved first states of the first context) from another location in the context save area 135, as specified in the context control table 115 (515) and the specific register 101a can be retagged with first context identifier tag (i.e., the context identifier tag 102a can be switched from the second context identifier tag associated with the second context to the first context identifier tag associated with the first context) (516). Only then can the context control unit 110 provide the first context with read and write access to the specific register 101a (518).

As mentioned above, when the specific register 101a is tagged with a second context identifier tag associated with a second context (i.e., when the context identifier tag 102a does not match the first context identifier tag but instead is a second context identifier tag), the second context identifier tag can be used to save, in a context save area 135 of the memory 130, all second context information (i.e., second states of the second context) from the specific register 101a. Saving all the second context information prior to providing the first context with access to the specific register 101a can be time consuming. Therefore, alternatively, the second context information (i.e., of second states of the second context) can be saved "on demand" (i.e., only when those second states are referenced by the first context) or a portion of the second context information (e.g., selected second states) can be saved initially and the remainder can be saved "on demand".

Figure 5C:
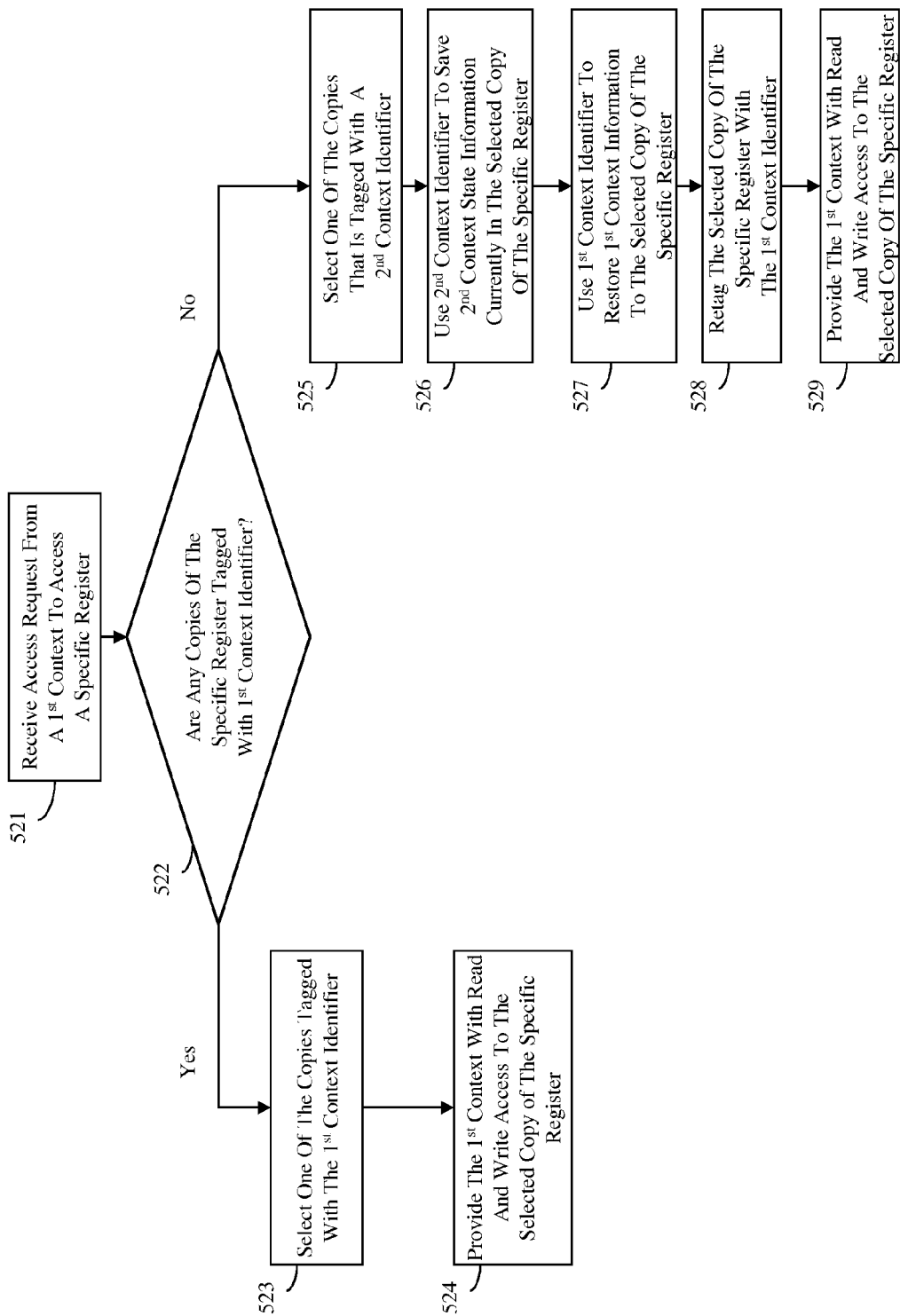

Referring to FIG. 5C, in another embodiment, the data processor 100 provided at process 501 of FIG. 5A comprise multiple copies of a specific register (see copies (1) and (2) of specific register 101b. In this case process 502 of FIG. 5A can comprise the following. An access request can be received, from a first context, for access to the specific register 101b (521). Then, a determination can be made as to whether any of the copies (1) or (2) of the specific register 101b is tagged with a first context identifier tag associated with the first context (522). That is, the context control unit 110 can determine whether the context identifier tag 102b(1) or 102b(2) on any of the copies (1) or (2), respectively, of the specific register 101b is the first context identifier tag associated in the context control table 115 with the first context. When at least one of the copies of the specific register is tagged with the first context identifier tag, a first copy (e.g., copy (1) of specific register 101b) which is tagged with the first context identifier tag can be selected (523) and the first context can be provided with read and write access to that first copy 101b(1) (524).

However, when none of the copies (1) or (2) of the specific register 101b is tagged with the first context identifier tag, one of the copies of the specific register (e.g., a second copy (2) of the specific register 101(b), which is tagged with a second context identifier tag associated with a second context), can be selected (525). Then, the second context identifier tag can be used to save, in the context save area 135 of the memory 130, all second context information (i.e., all second states of the second context) from the second copy (526). As in the previously described embodiment, the specific save location (i.e., the memory address) for the second context information of the second context within the context save area 135 can be specified in the context control table 115 (as indexed by the second context identifier) and this specific save location can be addressable only by a more privileged, trusted, context that has been given control of memory management. Next, the first context identifier tag can be used to restore first context information (i.e., previously stored first states of the first context) from another location in the context save area 135, as specified in the context control table 115, to the second copy (2) of specific register 101b (527) and the second copy (2) of the specific register 101b can be retagged with first context identifier tag (i.e., the context identifier tag 102b(2) can be switched from the second context identifier tag associated with the second context to the first context identifier tag associated with the first context) (528). Only then can the context control unit 110 provide the first context with read and write access to the second copy (2) of the specific register 101b (529).

As mentioned above, when the second copy (2) of the specific register 101b is tagged with a second context identifier tag associated with a second context, the context control unit 110 can use the second context identifier tag to save, in a context save area 135 of the memory 130, all second context information (i.e., second states of the second context) from the second copy (2) of the specific register 101b. Saving all the second context information prior to providing the first context with access can be time consuming. Therefore, alternatively, the second context information (i.e., of second states of the second context) can be saved "on demand" (i.e., only when those second states are referenced by the first context) or a portion of the second context information (e.g., selected second states) can be saved initially and the remainder can be saved "on demand".

Figure 5D:
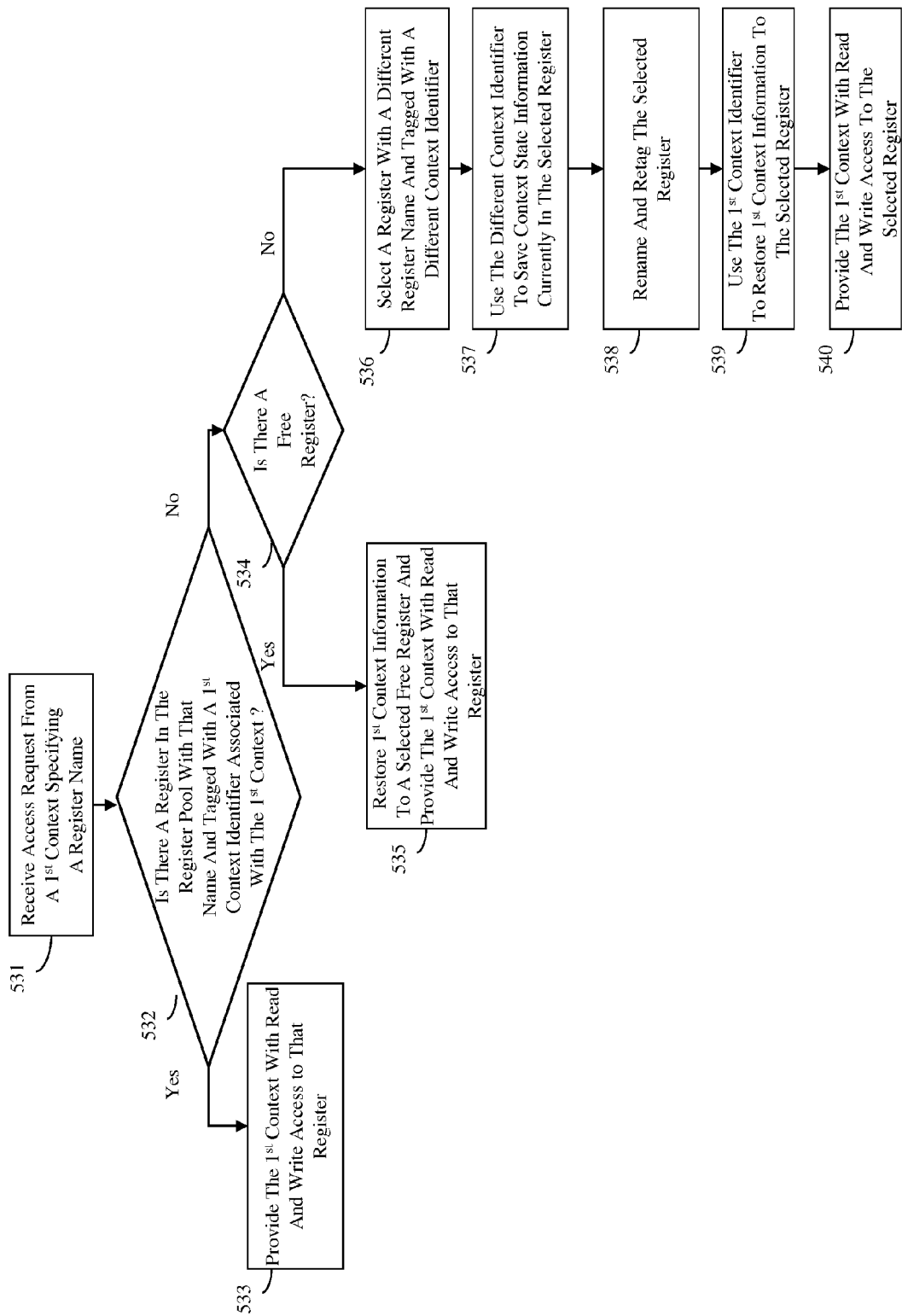

Referring to FIG. 5D, in yet another embodiment, the data processor 100 provided at process 501 of FIG. 5A can comprise a pool 150 of registers and there may be more registers in the pool 150 than are required for operation of all of the contexts (i.e., some of the registers may be free or, more particularly, empty). In this case process 502 of FIG. 5A can comprise the following. An access request can be received, from a first context, for access to a register having a first register name (531). A determination can be made as to whether any register in the pool 150 has the first register name and is tagged with a first context identifier tag associated with the first context (532). When a first register (e.g., register 101a) in the pool has the first register name and is tagged with the first context identifier tag (i.e., when the context identifier tag 102a matches the first identifier tag of the first context), the first context can be provided with read and write access to the first register 101a (533). However, when none of the registers in the pool 150 has the first register name and is tagged with the first context identifier tag a determination can be made as to whether any of the registers is free (534). If so, a free register (e.g., 101b) can be selected and the first context can be provided with access to that free register 101b (535). When none of the registers in the pool 150 has the first register name and is tagged with the first context identifier tag and when none of the registers in the pool 150 is free, a selected register (e.g., register 101n) can be selected from the pool (536). This selected register can have a different register name and can be tagged with a different context identifier tag associated with a second context. Then, the different register name and the different context identifier tag can be used to save, in the context save area 135 of the memory 130, any context information from the selected register 101n (537). Next, the selected register 101n can be renamed the first register name and retag with the first context identifier tag (i.e., can change the context identifier tag 102n from the different context identifier tag to the first context identifier tag) (538). Then, the first context identifier tag can be used to restore first context information from the context save area 135 to the selected register 101n (539) and the first context can be provided with read and write access to the selected register 101n (539), in the same manner as in the embodiments described above.

It should be understood that other embodiments of the data processing method can comprise providing a data processor 200, such as that described above and illustrated in FIG. 2, with one or more stackable registers. In this case, both the context identifier tags and stack level tags associated with corresponding contexts can be used to control access by the contexts to the stackable register(s) in a similar manner to that described above with regard to the data processing method shown in FIGS. 5A-5D. Furthermore, other embodiments of the data processing method can comprise providing a data processor 300, such as that described above and illustrate din FIG. 3, that is configured to both provide computer security enhancements and still facilitating authorized cross-context communications and/or cross-level communications.

Additional Discussion Regarding the Details of the Disclosed Data Processor Embodiments General Description of the Data Processor Embodiments The following is a more detailed discussion of the disclosed data processor and data processing method embodiments. As discussed above, these embodiments introduce the notion of contexts into the data processor architecture. That is, the data processor architecture is improved so that the hardware, without software intervention, separates contexts (i.e., isolates context states). This achieved through the use of context identifier tags, which are associated with most state registers in the data processor, but not in memory. The hardware enforces the property that a context can only access (i.e., read or write-over) state that is associated with its context. The embodiments allow contexts to share references to shared memory. Additionally, the embodiments introduce cross-context and/or cross-level (e.g., in the case of stackable registers) communications using call and return instructions that explicitly identify the number of registers to be passed between caller and callee context to prevent inadvertent leakage of context information. The embodiments further allow for shared resources, which do not completely solve the hierarchical systems problem. Therefore, the embodiments further provide for hard separation, I/O and other data that must move through shared areas. The embodiments further provide an automatic state save function that saves all the state associated with a running context when it is interrupted or loses control of the data processor. The embodiments also reduce the amount of code that must be trusted to only that code that manages the context and the assignment of resources, e.g., memory management.

It should be noted that, for purposes of this disclosure, only the initial boot code must be in context zero. By default, the machine starts in context zero at full privilege and no cross-context interrupts. The context zero is a special context, in the sense that by default this is the system start-up context. Consequently, this context can do a denial of service on all other contexts. Furthermore, it should be understood that there are two types of context separation: fine grained and coarse grained. Fine grain context separation allows for sharing of a single core and multiple contexts within the core. Coarse grain context separation assumes each core is dedicated to a single process. The embodiments disclosed herein relate to coarse grain context separation.

In operation, the disclosed embodiments of the data process tag registers contained within the processor with context identifier tags that are associated with corresponding contexts. That is, each register has a register name and that register name can be temporarily tagged with a context identifier tag of a fixed length, such as 8-bits, that identifies the context currently using that named register. Each time a context requests access to a register, the data processor compares the context identifier tag on the register to the context identifier tag associated with the context making the request to see if the register to be accessed and, particularly, the state contained in the register to be read and/or written-over belongs to the requesting context or a different context. If the register and, more particularly, the states therein belong to the requesting context, the operation (instruction) proceeds. If the register and, more particularly, the states therein belong to a different context, then the context state information contained in the register is saved in a context save area of memory and the previously saved context information associated with the requesting context is restored (i.e., loaded into the register). Then, the operation proceeds.

In the embodiments disclosed herein, all states of one context within a registered will be saved prior to restoring the states of another context and providing the other context with access. However, alternatively, for architectures with large amounts of program state, saving all state has poor performance. Therefore, to save time, also disclosed herein are embodiments that allow for "on demand" only state saving or automatic state saving for some states (e.g., states known to be needed for current context operation) and "on demand" saving of all other states.

In the embodiments disclosed herein, multiple copies of each register can be implemented. However, this approach is untenable if a large number of contexts are desired. A large number of copies of the registers is inefficient when there are a large number of contexts. Threads and context are similar so one could take a multithread CPU and implement explicit state passing. For this approach, the state of threads could be cached and not as much state is created as is used to support threads.

In the embodiments disclosed herein, context state information (i.e., states of contexts) can be saved in a context save area of the processor memory and context states saved in this context save area can only be addressable by a more privileged, trusted, context that has been given control of memory management (i.e., control of the memory management unit (MMU)). In an alternative embodiment, the context save area can be located within a discrete memory separate from the main memory of the processor. Such a context save area would have significantly less performance, which could only be improved by complicated caching. The preferred embodiment is for a data processor that does not support real memory references. If a data processor supports real memory references then additional restrictions have to be enforced (i.e., implemented) to prevent access to the state save area, if the state save area is resident in normal memory.

Context and Context Identifier Tag

The objective of the disclosed embodiments is hardware-enforced isolation of context information (i.e., context states). Such isolation is achieved through the use of context identifier tags (e.g., see context identifier tags 102$a$-$n$ of FIG. 1, 202$a$-$n$ of FIGS. 2, and 312$a$-$n$ and 322$a$-$m$ of FIG. 3) that are associated with corresponding contexts. These context identifier tags can have a fixed length (e.g., 8-bits, 10-bits, 12-bits, etc.). This fixed length can correspond to the number of contexts directly supported by the hardware.

Figure 7:
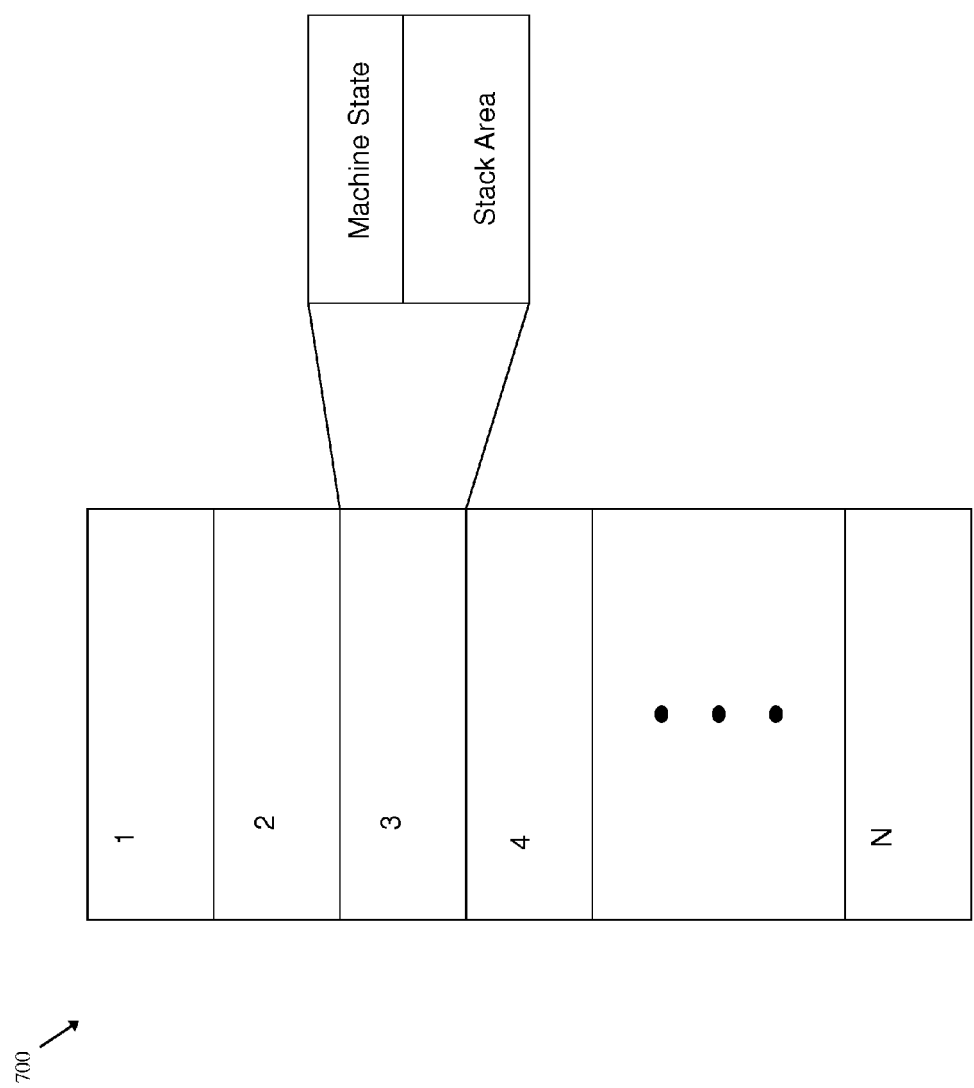
FIG. 7 is an illustration of an exemplary context save area in memory.

For the most part, in each of the embodiments, each register within the data processor (e.g. registers 101$a$-$n$ of data processor 100 of FIG. 1, stackable registers 201$a$-$n$ of data processor 200 of FIG. 2 and registers 311$a$-$n$ and 321$a$-$m$ of data processor 300 of FIG. 3) can be tagged with a context identifier tag that is associated with the context currently using that register. Tagged registers can include, but are not limited to, program registers (e.g., general purpose registers and floating-point registers) and branch registers (e.g., link registers, count registers and condition registers) However, it should be understood that some registers, such as those used for the timer/clock, debug control, storage control, and process control, should not be tagged. A context control table within a context control unit (e.g., table 115 in the context control unit 110 of the data processor 100 of FIG. 1, table 215 in context control unit 210 of the data processor 200 of FIG. 2 or the table 315 in the context control unit 310 of data processor 300 of FIG. 3) can be indexed using the context identifier tags (CIDs). A context save area (e.g., see exemplary context save area 700 as shown in FIG. 7) can similarly be indexed using the context identifier tags (CIDs).

Figure 6:
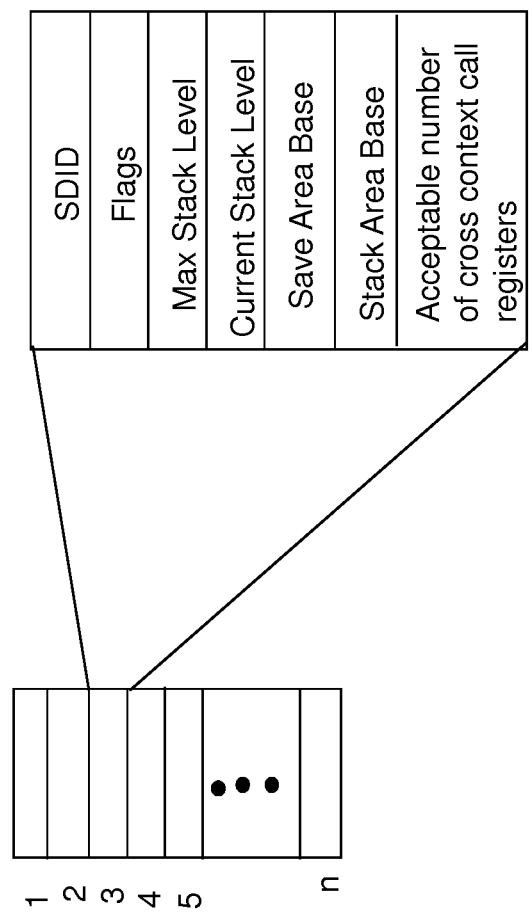
FIG. 6 is an illustration of an exemplary entry in a context control table.

In the disclosed embodiments, this context control table is a part of the hardware that can only be referenced by the context that it is assigned to. Furthermore, each entry in the context control table is called a context descriptor and can contain the following, as shown in FIG. 6:

A security domain identifier (SDID) for the context associated with the entry.

A supervisor-only constraint bit, which indicates whether the context can or cannot execute hypervisor instructions.

A persistent context bit, which indicates whether the context is persistent in memory.

A maximum context stack level tag (MLVL), when the registers are stackable.

A current context stack level tag (LVL), when the registers are stackable.

A physical address (i.e., a memory address), where the context state is located in a context state save area of memory.

Acceptable number of cross-context call registers.

The context identifier tags (CIDs) can be thought of as creating multiple virtual data processors (i.e., virtual computer processing units (CPUs)). Bit(s) can also be added that control which privilege state the context has access to in its highest privilege state. The addition of a supervisor-only constraint bit changes a processor, such as Power PC440 data processor that normally would have program and supervisor state, into a processor, which has program state, restricted supervisor state, and unrestricted supervisor state. Code in unrestricted supervisor state has access to the entire machine. Access control could be further subdivided with more bits (e.g., one for each resource or group of resources, such as a bit for control of the memory management units (MMUs), a bit for context descriptors, a bit for interrupt vectors, etc.). It should be noted that each entry in the context control table contains a pointer to the associated context save area and a count for the number of levels of stacking allowed. Consequently, the context save locations for contexts within the context save area of memory do not have to be contiguous and do not have to be uniform size. Whether the context save locations are contiguous and of uniform size is configurable by the code that initializes the context control table.

Context Identifier Tag, Registers and Machine State

As mentioned above, in the embodiments disclosed herein most registers (e.g. registers 101a-n of data processor 100 of FIG. 1, stackable registers 201a-n of data processor 200 of FIG. 2 and registers 311a-n and 321a-m of data processor 300 of FIG. 3) are tagged with context identifier tags associated with the context that owns the content of the register. These registers can comprise non-stackable (e.g., as shown in FIG. 1) and/or stackable registers (as shown in FIG. 2). Other processor hardware components (e.g., a program counter or instruction pointer) can similarly be tagged with the context identifier contexts that owns the contents of the hardware component. In any case, the tagged registers can include program registers, such as a general purpose register and a floating-point register, and/or branch registers, such as a link register, a count register and a condition register)). However, some registers (e.g., timer/clock registers) will remain untagged.

Those skilled in the art will recognize that stackable registers (e.g., as shown in FIG. 2) facilitate context reentrancy during interrupts. Any context that wants to be fully reentrant must save all non-stackable registers upon entry and restore upon exit. The hardware automatically saves the stackable registers upon reentry to a context. In an exemplary data processor (e.g., a PowerPC 440), registers (e.g., R3-R10) for parameter passing can be stackable. In addition, the machine status and interrupt save restore registers can be stackable. As discussed above with regard to the data processor 200 of FIG. 2, stackable registers can be tagged not only with a context identifier tag, but also a stack level tag (LVL) associated with a context. The stack level tag can indicate which level of the context state save register stack the current value in the register is associated with. It should be noted that, for stackable registers, the hardware will treat the stack level tag as an extension of the context identifier tag for the purposes of determining a match of the currently running context. Each context has a single system call entry point. More than one system call (e.g., more than one interrupt) can point to the same context. They do not have to go to the same entry point. It should be noted that system calls are distinguishable from context calls as discussed in greater detail below.

Cross-Context and/or Cross-Level Communications

As mentioned above, data processor embodiments disclosed herein, such as the data processor 300 of FIG. 3, facilitate cross-context and/or cross-level communications. To accomplish this system calls can comprise any of the following:

System call within the same context at the current level. This is equivalent to the old supervisor call without hardware register stacking.

System call within the same context at the next level. This is equivalent to a cross-context system call to self, exploiting register stacking.

System call to a context indicated by the interrupt vectors. This is equivalent to a hypervisor call exploiting register stacking.

System call to a specific context. This is equivalent to a cross-context call with register stacking.

All system calls above (1) (i.e., cross-context and/or cross-level system calls (2)-(4)) will be performed based on instructions from the caller and callee contexts/levels.

For example, the caller context (and, if applicable, level) can specify in a call instruction how many registers it is willing to pass to the callee context (and, if applicable, level) and how many it is willing to receive from the callee context (and, if applicable, level). The callee context (and, if applicable, level) can specify in a return instruction how many registers it is willing to pass to the caller context (and, if applicable, level) and how many it is willing to receive from the caller context/level. That is, the caller context (and, if applicable, level) and the callee context (and, if applicable, level) each provide instructions that place limits on how many registers that they desire to receive and can pass on (i.e., how many registers can go in either direction). This number can be, for example, equal to the number of general purpose registers).

The hardware and, particularly, the context control unit (e.g., context control unit 310 of the data processor 300 of FIG. 3) can allow (i.e., can be configured to allow) the minimum number of registers specified in the two instructions to be passed in either direction. For example, if the caller context indicates in a call instruction a desire to receive back 3 registers from a callee context and a willingness to pass 5 registers to the callee context and if the callee context indicates in a return instruction a willingness to pass 6 registers to the caller context and a desire to receive 4 registers from the caller context, then the context control unit can ensure that the caller context will receive the lesser number of registers (i.e., three registers) from the callee context and the callee context will receive the lesser number of registers (i.e., four registers) from the caller context in return.

It should be noted that for a cross-context call, four registers can be used: (1) Save Restore Register State (SRRS); (2) Save Restore Register Return Location (SRRRL) the program counter of the caller; (3) Save Restore Register Called Context (SRRCC); and (4) Save Restore Register Return Context (SRRRC). SRRCC can contain three items: (1) the context identifier tag of the context being called (i.e., the context identifier tag for the callee context); (2) the number of input parameters; and (3) the number of output parameters (parameters expected back form the call). SRRRC can contain three similar items: (1) the context identifier tag of the caller context; (2) the number of parameters the callee context was called with; and (3) the number of parameters to return (to the calling context). On a cross-context call, the callee context's SRRRC can receive the caller context's context identifier tag, the number of parameters the caller context will send and the number of parameters the caller context expects back. Also, SRRCL can receive the callee context's context identifier tag, the number of input parameters and the number of parameters expected back. If the callee context disagrees with the number of parameters supplied by the caller context, it can return with an error code. When the callee context returns, it can adjust the number of parameters to be returned (field in SRRRC), normally it will return to the callee context. However, it should be noted that any context with privilege can return to a context other than the context that called it. On the return, the context control unit can send back the lower of the output parameters set in SRRCL and output parameters set in SRRRC. On a cross-context call, when the callee context gets control, SRRRS, SRRRL, and SRRCC can be set with the values from the caller context. For the callee context, SRRRC can be set to the value of SRRCC of the caller context.

It should further be noted that for cross-context interrupts/exceptions the same mechanism can be used, except the parameter input and return fields can be forced to zero. Consequently, no registers will be moved between the interrupt processing code object and the code that was interrupted.

Memory Addressing

As mentioned above, the embodiments disclosed herein can be implemented as modifications to an existing data processor (e.g., the PowerPC440 or a data processor with a more complicated architecture). This can be accomplished without modifying the processor memory because the context identifier tags are not put in the physical memory and physical addresses are not tagged. Instead, as mentioned above, a context control table (TBL) (e.g., table 115 in the context control unit 110 of the data processor 100 of FIG. 1, table 215 in context control unit 210 of the data processor 200 of FIG. 2 or the table 315 in the context control unit 310 of data processor 300 of FIG. 3) can be used to translate from virtual addresses to real addresses. For example, the PowerPC 440 does not use page table entries. There are only 64 TLB entries. Each context control table entry can contain a virtual address, real address and a process identifier (PID) and other characteristics, user, supervisor, read write, execute, (6 attribute bits 3 for each mode user or supervisor.) and page attributes. By convention, if the process identifier for a context control table entry is zero, then any process identifier in the machine can use the entry. This facilitates sharing of memory between processes without replicating the TLB entry.

The embodiments disclosed herein can further provide domains by extending the context control table with a security domain identifier (SDID). An SDID of zero can, for example, mean that any domain can use the entry and the process identifier can be ignored. In the embodiments disclosed herein, multiple contexts can be within a single domain. Contexts can share memory with a processor identifier of zero. For architecture with page tables, the security domain identifier can be associated with the segment lookaside buffer or where effective addresses are turned into physical addresses. However, it should be noted that context control table entries still have to match the process identifier.

Interrupt Vectors

Additionally, disclosed herein are embodiments wherein an interrupt always goes to the same address (or to the address in the interrupt vector). An interrupt vector is a register that holds the address of the routine that will process the interrupt. Interrupts have to be controlled carefully. Thus, in the disclosed embodiments interrupt vectors with one additional vector (register) are extended for hypervisor exception. Each interrupt vector also has associated with it a context identifier tag and a cross-context bit. The cross-context bit indicates whether the interrupt can be controlled by the local context. If the cross-context bit is zero then the interrupt can be processed in the local context, whereas, if the cross-context bit is one, the interrupt can be processed in the context indicated by the associated context identifier tag. The address for interrupt processing does not change; it is the same whether or not a cross-context interrupt is allowed. All contexts use the same interrupt vectors.

Figure 8:
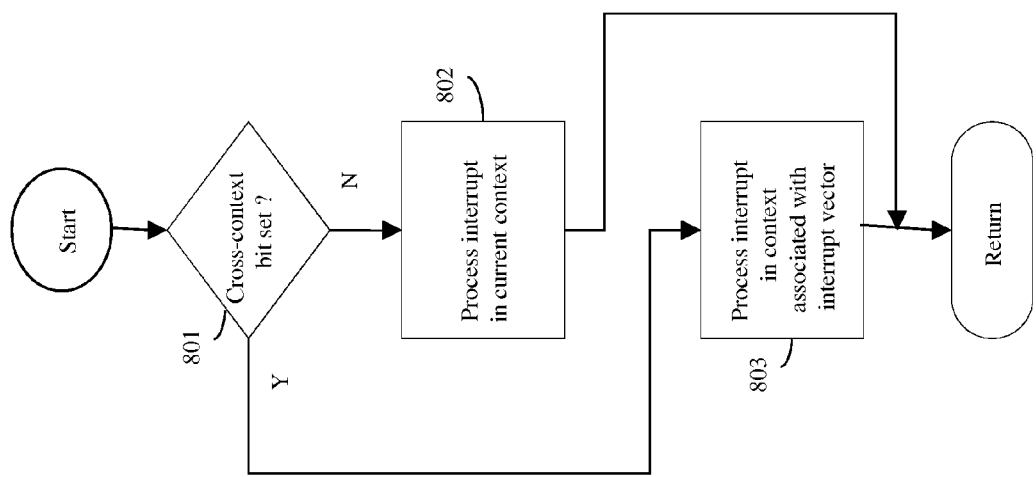
FIG. 8 is a flow diagram illustrating an exemplary interrupt process.

FIG. 8 is a flow diagram illustrating the above-described interrupt processing method. As shown in FIG. 8, a determination is made as to whether or not there is a cross-context bit set (801). If so, then the interrupt can be processed in the current context (802). If not, the interrupt can be processed in the context associated with the interrupt vector (803).

Optimizations

Additionally, disclosed herein are embodiments wherein the start-up time can be improved by saving a limited amount of state for a cross-context call (or context switch) and the remaining state, if needed, on demand. The optimal implementation might use register files, where there are multiple copies of each register in the data processor so a state save would only be done if there were no available (untagged) register. For example, in a data processor, such as a PowerPC 440, the first n registers can be automatically saved and the remaining registers can be saved in groups of m, if used (i.e., "on-demand".). Furthermore, some registers would initially be saved (e.g., general purpose registers) and other (e.g., floating point registers) would not. Those that were not initially saved, would only be saved (e.g., in groups of p), if used (i.e., on-demand). At initialization, context zero can be started with all privileges enabled by default. As mentioned above, the hardware (i.e., the context control unit) can use a dedicated area of memory (i.e., a context save area) to store each context's state. The context save area is not addressed by software running on the data processor, but instead is only addressable by the hardware (i.e., the context control unit).

Extensions

Machine State can be Subdivided

Additionally, disclosed herein are embodiments wherein a single bit can, for example, indicate whether a context has access to sensitive machine registers. This bit can be part of the control information of every context. Consequently, any (one or more) context(s) could have control. Alternatively, the sensitive (critical or control) machine state can be divided into subsets and can be assigned a bit associated with each subset of state. Examples of sensitive state include TLB control, page tables (if a machine has virtual memory), allocating context, controlling interrupt vectors, etc. Since these control bits are associated with every context, one or more context can have access to various parts of the control information for the machine. There is no hierarchy required.

Multiple Sets of Interrupt Vectors

Additionally, disclosed herein are embodiments wherein interrupt vectors for all contexts can be located in a single set of registers. These interrupt vector registers can each be associated with a bit to control access. However, alternatively, interrupt vectors can be located in memory, thereby allowing a separate set of vectors for each context. In this case, the ability to write these vectors would have to be controlled. Trusted software would have to set them up when initializing a context and have a mechanism for indicating which individual vectors were under local (writeable) control. Alternatively, there can be multiple sets of interrupt registers and a mechanism can be implemented for associating each context with a set of interrupt registers. However, the software that controls the interrupt vectors, whether in memory or in registers, has to be trusted. They are privilege hardware. In our implementation there are one or more bits associated with this hardware that can grant control to one or more contexts as required.

Over-Committing Context

Additionally, disclosed herein are embodiments wherein the data processor can have $2^n$ contexts, where n is the number of bits in each context identifier tag. This allows for secure reassignment of context identifier tags when a context terminates. To enable secure over-commitment of context, additional facilities have to be added. As mentioned above, in the disclosed embodiments only a small amount of system software needs to be trusted. Specifically, the software that manages the memory management unit (MMU) (i.e., the memory control) and the software that creates and manages contexts must be trusted. However, in the disclosed embodiments, even this trusted software is not given access to the internal state of another context.

Thus, a mechanism can be provided to enable the system to support more context identifier tags than are allowed by the hardware implementation. A system that allow for over-commit requires more trust of the software than a system that is limited to the number of context identifier tags supported by the hardware because the hardware has no knowledge of the relationship between the active contexts. A context could have called another, a context could have been called by another context, an I/O interrupt could be pending, etc. Thus, the embodiments disclosed herein provide a mechanism to address these issues without requiring that the other code in the system be fixed up after a context has been paged out.

Figure 9:
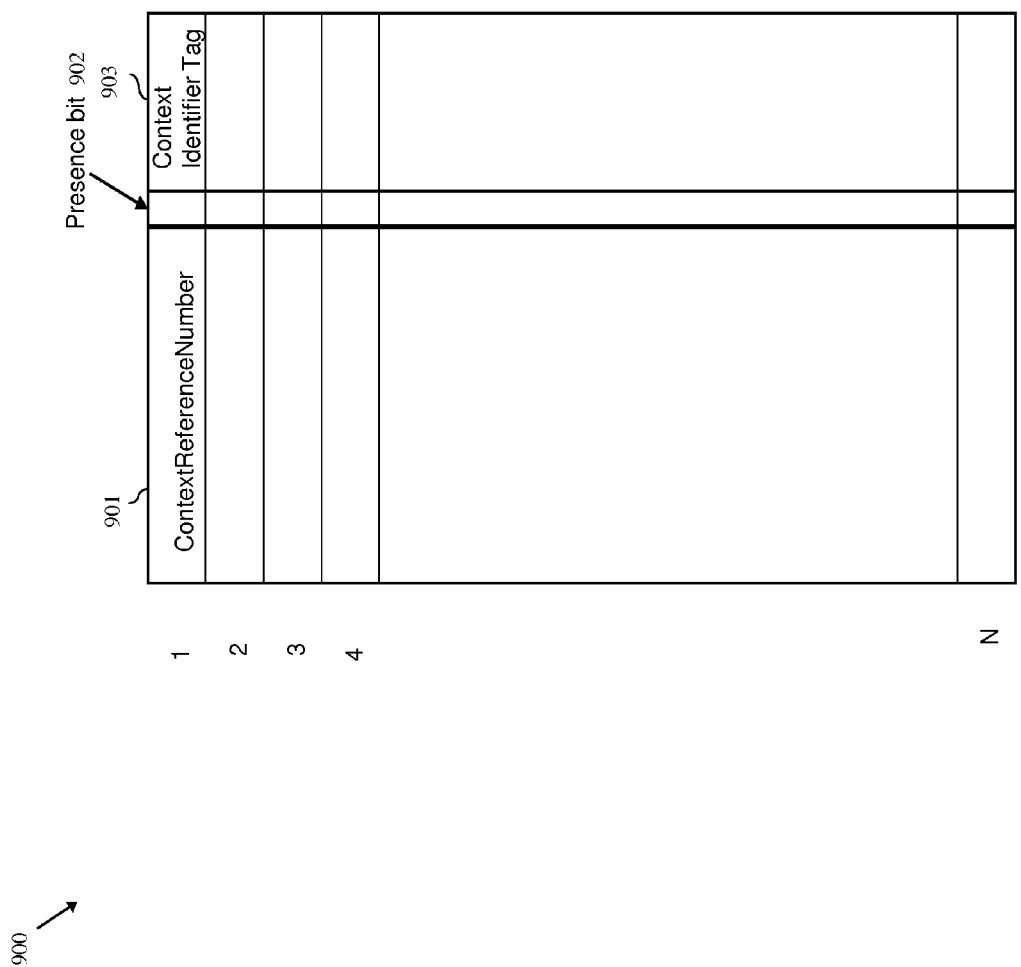
FIG. 9 is an illustration of an exemplary context indirection table.

Specifically, in order to allow for over-commit, embodiments disclosed herein introduce a context indirection table. As illustrated in FIG. 9, this context indirection table 900 can have three fields: (1) context reference number 901; (2) presence bit 902, and (3) context identifier tag 903. The context reference number can be longer than the context identifier tag (e.g., the context reference number can be 32 bits and the context identifier tag can be 8 bits). Thus, the context reference number and context identifier tag can essentially function as a long name and short name, respectively, for a context or as a hash table for locating a context. The context reference number is used in the code to refer to the context. The presence bit (or paged out bit) indicates whether or not the context reference number is present in memory. For example, a presence bit of zero can indicate that the context reference number is present in memory, whereas a presence bit of one can indicate that the context reference number is not present. The context identifier tag is used by the hardware for the associated context reference number. The context reference number is only used by the hardware to look up the assigned context identifier tag for the context. The context reference number can be assigned by software when the code is loaded into memory. It should be noted that instructions that, in the previously described embodiments, reference the context identifier tag would in this case have to reference the context reference number instead. For example, the cross-context call instruction and/or cross-context return instruction have to be changed to reference the context reference numbers of the caller and callee contexts as opposed to the context identifier tags. This means that the context reference number of the calling context has to become part of the state of a running context. This may require a new register or, alternatively it could be saved in the context save area. In any case, it has to be unique for all active (running or suspended) instances of contexts, but not necessarily unique across all of time. For example, systems could be implemented were these numbers were unique across time by allocating a sufficiently large enough number of bits. The size (i.e., the number of bits) of the context reference number will be implementation dependent.

Figure 10:
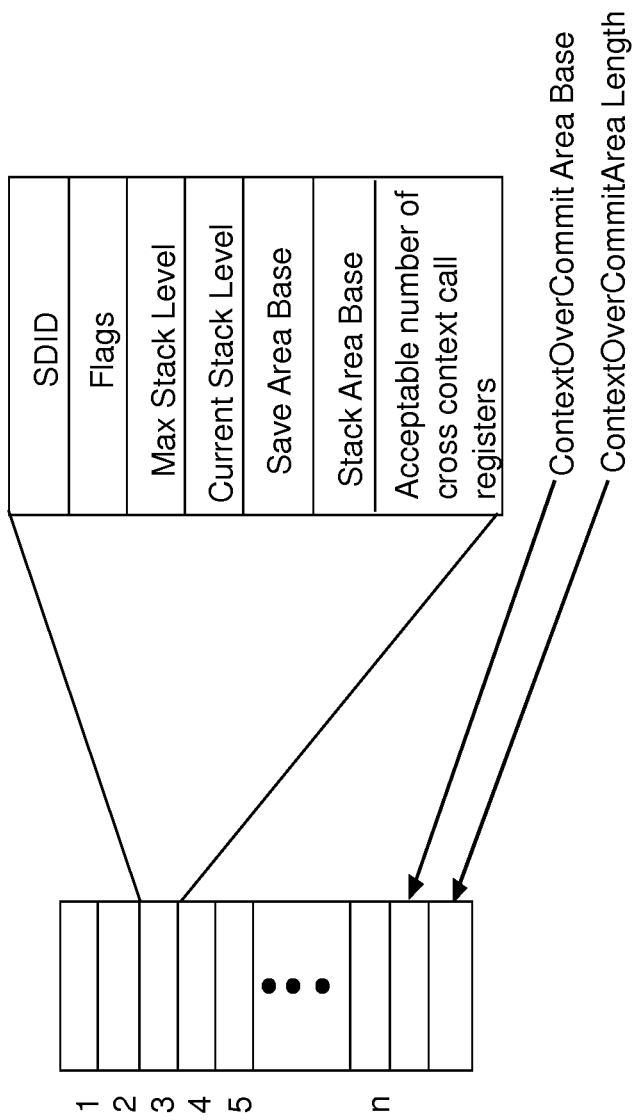
FIG. 10 is an illustration of an exemplary context over-commit area in memory.

Additionally, in order to allow for over-commit, embodiments disclosed herein introduce a context over-commit area in memory, as shown in FIG. 10. Like the context save area, the context over-commit area is an area of memory that is only addressable by context control unit, as the context over-commit area is pointed to by the context control table. The context over-commit area is where context are stored that are available but not active. With respect to context over-commit, three new privileged instructions are introduced: (1) FlushContext (n), (2) StoreContext(n,r), and (3) RestoreContext(n,j). These three instructions use the context reference number, n. The FlushContext(n) instruction causes the state of a context having a context identifier tag n to be flushed to the context save area. The StoreContext(n,r) instruction causes the hardware to move the saved state in the context save area associated with context identifier tag n into the next available slot in the context over-commit area. The context reference number is also stored in the context over-commit area. It returns the context reference number, r, of the context that was just backed up. The RestoreContext(r,n) causes the hardware to restore context reference number r from the context save area and assign it to the context identifier tag n. Each "slot" in the context save area is a little larger than the spaces in the context save area. In the context over-commit area the contents of the context save area are preceded by one word of flags and the context reference number. The first bit in the flags indicates whether the slot is in use.

The controlling software has to work with the software that controls memory allocation to assure that all memory areas associated with context n, the context that was backed up, have been appropriately saved. When it is time to restore the context, assuming that the memory is appropriately restored, the software managing restoring the context uses the RestoreContextState(r,n) instruction to restore the context to context identifier tag n.

These embodiments that account for over-committing of context are focused on protecting the internal state of a computation by using the context identifier tag. In order to do this both the internal state and the memory associated with the context are saved (or paged out). A paging system, such as exists in many modern operating systems can be used to manage the memory.

In this case, managing the internal state can be accomplished as follows. When the software that manages starting and stopping context determines that a new context needs to be run and that there is no available context identifier tag, it selects, using an algorithm of its choice, a context to be "paged out". It then flushes the internal state of that context to its context save area, moves the context save area to the context over-commit area, stores (possibly clearing, depending on the implementation) the memory associated with the context, sets the context presence bit in the context indirection table to one, and loads and starts the new context. The amount of memory allocated to the context over-commit area determines how much over-commitment is possible.

If a context is in memory and gets stored (or paged out) it may have been in the middle of a cross-context call or some other activity associated with some other context. The context indirection table provides a mechanism to inform the operating systems when a paged out context is referenced by a running context. Recall that cross-context calls are done using the context indirection table. The context reference number is looked up in the table and the call goes to the indicated context number. Similarly, when a context completes a cross-context call it uses the context reference number to return to the caller. When a context is paged out, the presence bit in the context indirection table is set to one. Whenever a context tries to return to or call a context that has been paged out, and interrupt will be generated that is handled by the operating system. The operating system (OS) can take any appropriate action using whatever algorithms it chooses to come to a decision. All of the software that makes these decisions and manages this table is trusted.

As mentioned above, a system similar to virtual memory paging could be used for further over-commitment. Without over-commitment, software access to the context state saved and restored by the hardware is avoided. With over-commitment, software direction of this hardware has to be enabled and, thus, with over-commitment, the issue of how to protect the context's memory and, particularly, the integrity and possibly the confidentiality of that memory if it is written to disk is raised. In this case, the context's internal state would be saved in the context over-commit area and the context memory would be written to some form of storage (disk). If the ability to store the entire (including internal state) context on disk is desired, then some software access is given so that the state can be read and written. Internal state that is stored on disk could be protected (integrity and perhaps confidentiality) through encryption or a hash generated by the hardware. However, unless all the state associated with a context is protected, it may not be useful to protect only the internal state. This implies that the paging system should be augmented with a mechanism to protect the integrity and possibly confidentially of all context memory/state that is written to disk.

It should be noted that if the context over-commit area becomes full, no context can be saved until there is a free area.

Re-Using Contexts

Additionally, disclosed herein are embodiments wherein special considerations are taken when a context terminates. If the context is carefully written, it can erase the memory that has been assigned to it before returning to the system. However, the context has no control of or access to its context save area, because the context save area is managed by hardware. If the context save area is not cleared, the next context may have access to saved state. Thus, these embodiments facilitate reuse without leaking state information by using a subset of the functions for over-committing context. These functions can be implemented without implementing the context over-commit area if it is desired to enable reuse without enabling over-commitment. The FlushContext(n) instruction can be used and can define a return context instruction. The FlushContext(n) instruction, when used by a non-privileged context, can cause the state of the issuing context to be flushed to its context save area. The parameter, n, is ignored. The return context instruction can be defined to have the side effect, through one or more mechanisms, of clearing (or zeroing) the context save area. The intent is that these two instructions would be the last two instructions issued by a context. Those skilled in the art would recognize that these two instructions could alternatively be combined into one instruction and/or could be preformed by the privileged code that executes when a context terminates. In one embodiment, zeros can be written to the context save area. In this case, the return context instruction would take longer because it does not complete until the save area has been zeroed. In another embodiment, the hardware information in the context control table can be set to indicate that none of the states is owned. When the new context starts, if the data is not owned a read will store zero, reset the bit, and return zero. Writes will store data and reset the owned bit allowing future reads to return data.

Changes to the Trust Model

As mentioned above, the embodiments disclosed herein use context identifier tags to provide a hardware-enforced isolation mechanism. That is, no context can access state of another context unless it is in memory and shared between the contexts or it is passed in an explicit cross-context call. Nevertheless, as described-above, the embodiments have not entirely eliminated the need to trust the operating system (OS). Specifically, contexts have to trust the part of the operating system that manages memory and manages contexts. These can be separate contexts to protect them from the operating system, from one another, and from other code running on the system. The state save associated with a cross-context call is automatic and done by hardware increasing the hardware-enforced separation. When interrupts cause a context switch, the interrupted context is protected from the interrupting context. Interrupts that need to be handed locally, such as divide by zero, do not require protection because local state is required for the interrupt to function.

Data Processor Architecture

For purposes of illustration, the disclosed embodiments have been described herein with reference to modifications to a known data processor, such as a PowerPC 440 microprocessor. However, those skilled in the art will recognize that the embodiments can alternatively be implemented as modifications to any other data processor (e.g., to a data processor with a more complex architecture than the PowerPC 440).

Figure 11:
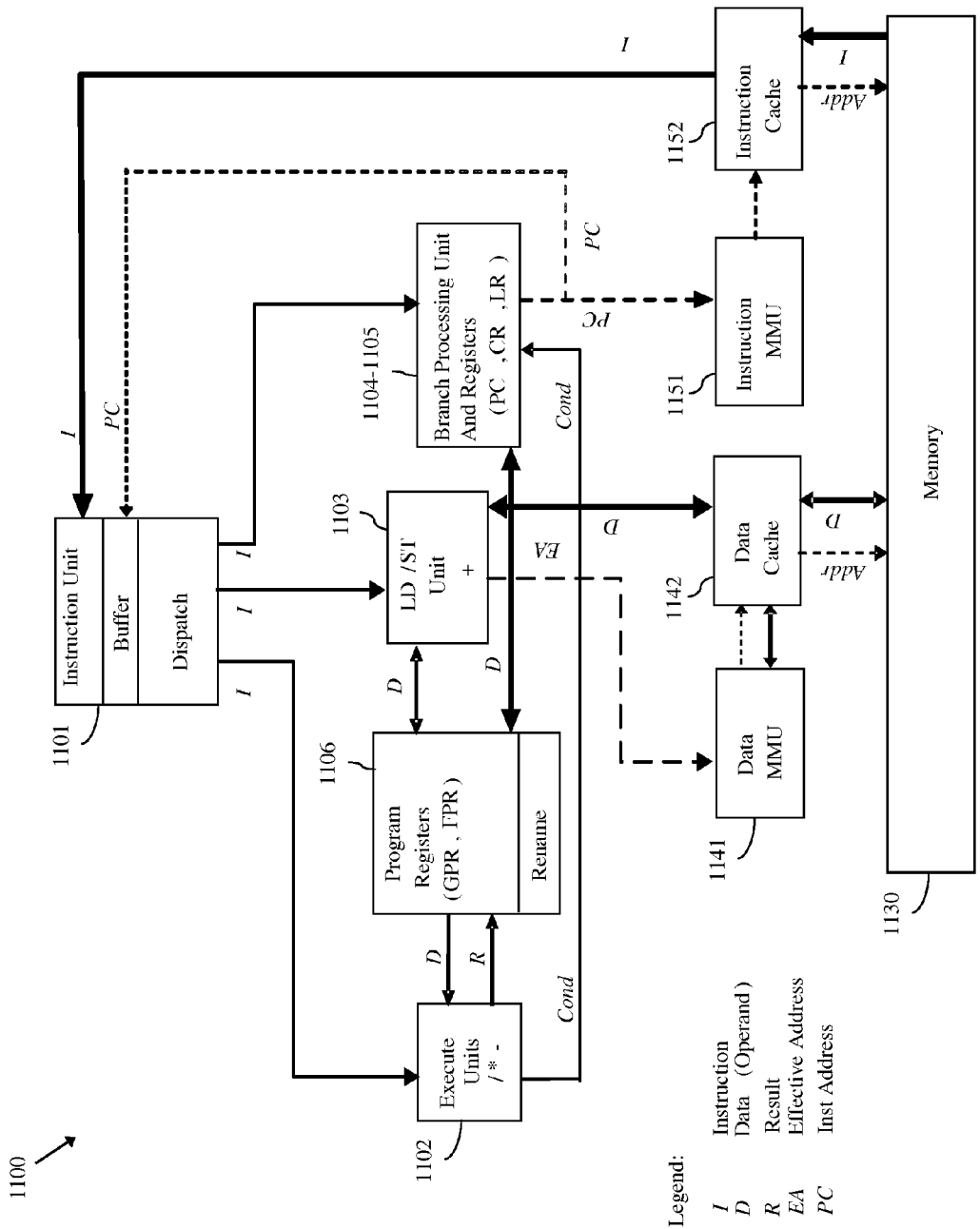
FIG. 11 is a schematic diagram illustrating an exemplary data processor.

FIG. 11 is a schematic drawing illustrating the high-level architecture for a known data processor 1100, such as the PowerPC 440. This data processor 1100 comprises an instruction unit 1101, which comprises an instruction buffer and dispatch and which receives, queues, and dispatches instructions; maintains registers with counter and link addresses; and condition information (CR). Instructions are dispatched as appropriate to execution units 1102 (e.g., integer and floating point), a load/Store unit 1103, and a branch processing unit 1104. Arguments and results of the instructions are stored in the program registers 1106 (e.g., the general purpose registers (GPR), and floating point registers (FPR)). The load/store unit 1103 and the instruction unit 1101 retrieve and store data to a main memory 1130. Addresses for the interactions are translated from logical to physical addresses in a data memory management unit (DATA MMU) 1141 and instruction memory management unit (INST MMU) 1151 and the data itself are cached in the respective data cache 1142 and instruction cache 1152.

Figure 12:
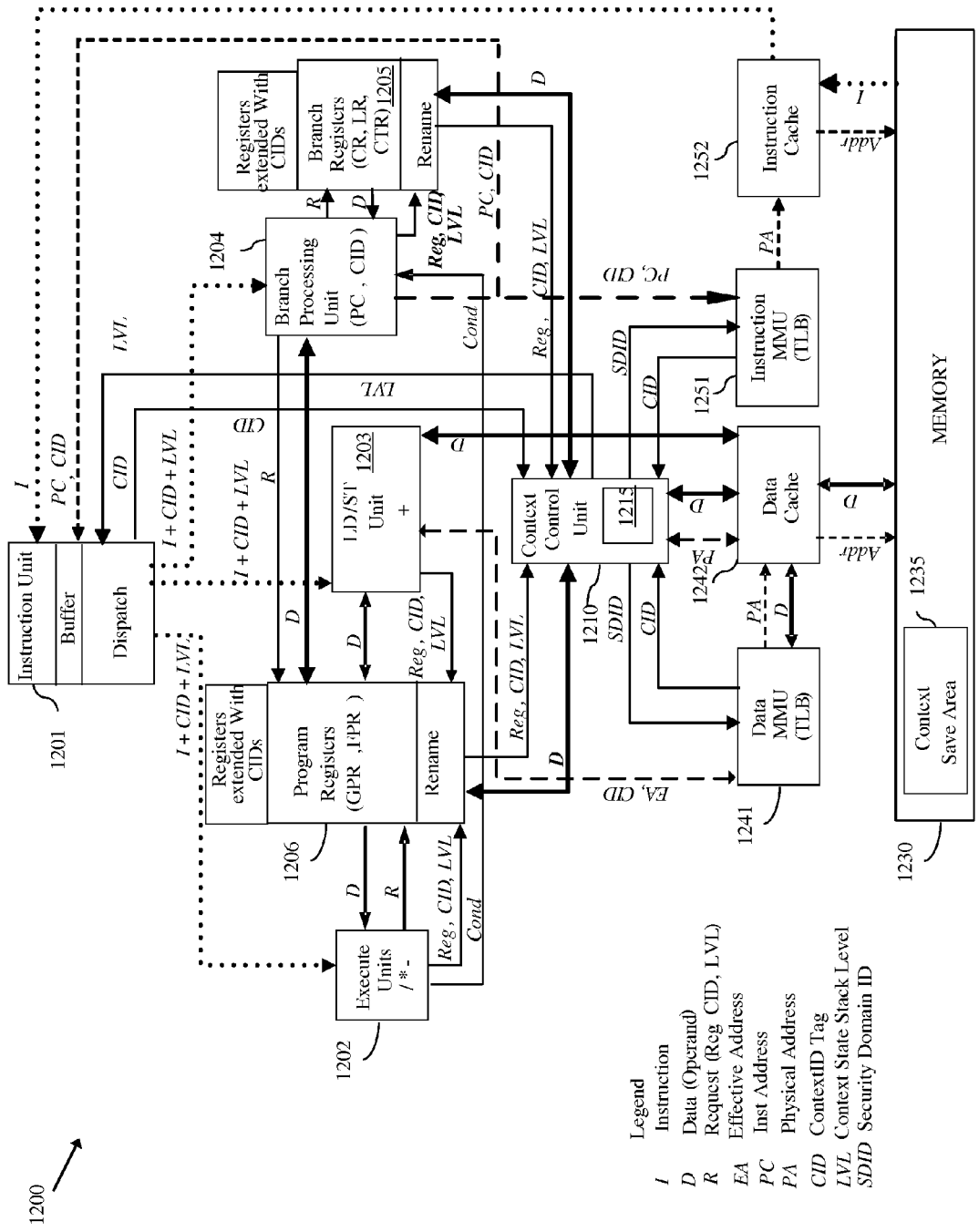
FIG. 12 is a schematic diagram illustrating the data processor of FIG. 11 modified to include additional features of the disclosed data processor embodiments as set forth in FIGS. 1, 2 and 3.

FIG. 12 is a schematic drawing illustrating the high-level architecture for a microprocessor 1200, which incorporates the features of the microprocessor 1100 described above and is further modified to incorporate the novel features (e.g., a context control unit 1210, context save area 1235 within memory, etc.) of the disclosed embodiments, as discussed above with regard to FIGS. 1, 2 and/or 3. That is, like the processor 1100 above, this processor 1200 can comprise an instruction unit 1201, which comprises an instruction buffer and dispatch and which receives, queues, and dispatches instructions; maintains registers with counter and link addresses; and condition information (CR). Instructions can be dispatched as appropriate to execution units 1202 (e.g., integer and floating point), a load/store unit 1203, and a branch processing unit 1204. Arguments and results of the instructions can be stored in the program registers 1206 (e.g., the general purpose registers (GPR), and floating point registers (FPR)). The load/store unit 1203 and the instruction unit 1201 can retrieve and store data to a main memory 1230. Addresses for the interactions can be translated from logical to physical addresses in a data memory management unit (DATA MMU) 1241 and instruction memory management unit (INST MMU) 1251 and the data itself can be cached in the respective data cache 1242 and instruction cache 1252.

However, as illustrated, the registers (e.g., the program registers 1206 and branch registers 1205) and machine state can further be extended with context identifier tags (CIDs). A security domain identifier (SDID) and a context stack level tag (LVL), if the registers 1205 and/or 1206, are stackable, can also be added. The memory 1230 can be divided into security domains. The memory 1230 can be extended with an SDID. The context control unit 1210 contains a context control table 1215 that provides the necessary mapping. The DATA MMU 1241 and the INST MMU 1251 can use the context control unit 1210 to get the SDID for a reference to confirm that the reference is legitimate. If the reference is legitimate, the DATA MMU 1251 can give the physical address to the data cache 1242 and the data can be read (data or instruction) or written (data only) based on the request.

The data processor 1200 can further comprise a context save area 1235 within the memory 1230. This context save area 1235 can only be addressed by the hardware of the context control unit 1210. The context control unit 1210, which is in communication with the various registers 1205, 1206, can also be in communication with rename and dispatch units. The instruction unit 1201 and, particularly, the dispatch unit of the instruction unit can use the context control unit 1210 to get the context identifier tag and, if applicable, the LVL of the context for the instructions that it is about to dispatch. Instruction unit 1202 dispatches the request to the load/store unit 1203 and the execute unit 1202, which each operate on the program registers 1206, and to the branch processing unit 1204, which operates on the branch registers 1205.

The load/store unit 1203 can receive the instruction from the dispatch unit. The load/store unit 1203 can be used for addition. When used for addition, it functions the same as the execute unit. For a load, the load/store unit 1203 receives the instruction, the name of the program register 1206 being loaded from the rename unit using the register (from the instruction), the CID, and the LVL (if applicable). It also passes the effective address and CID to the data cache 1242 so that it can retrieve the data. When the data is retrieved, it is placed in the indicated register 1206 and the load/store unit 1203 is ready for the next instruction. For a store, the load store unit 1203 retrieves the name of the program register 1206 containing the data from the rename unit. It extracts the data from that program register and passes the effective address (EA), CID, LVL (if applicable) and data to the data cache 1242 to be written. Once the data is written, the load/store unit 1203 is ready for the next instruction to store data or retrieve data.

The execute units 1202 can perform arithmetic operations on program registers 706. An execute unit 1202 receives the names of the program registers 1206 it will operate on from the rename unit using the register name, CID, and LVL (if applicable). It then requests the contents of these program registers 1206, performs the indicated operation, and requests that the result be placed in the indicated program register.

Following processing by an execute unit 1202, any resulting condition codes can be made available to the branch processing unit 1204. The branch processing unit 1204 can receive instructions, the CID and the LVL (if applicable) from the instruction unit 701 and, more particularly, from the dispatch unit of the instruction unit 1201. The branch processing unit 1204 can also contain the program counter and associated CID for the current context. The branch processing unit 1204 can receive the name of the branch registers 1205 it will need from a branch registers rename unit using the request, the CID, and LVL (if applicable). It can then receive the contents of the branch registers 1206 and perform the branch, as appropriate. Once done, the branch processing unit 1204 can informs the instruction MMU 1251 and the instruction unit 1201 of the next instruction to be preformed as well as the CID associated with that instruction. If the branch is a cross-context call, it marks the branch registers 1205 that are being passed into the new context with the CID of the new context and changes the current CID to the CID of the new context. It should be noted that, for simplicity, FIG. 12 shows two rename units. However, those skilled in the art will recognize that there could be one or more rename units in the data processor 1200, each rename unit can be adapted to provide the correct name of any register with consistency between the rename units.

Figure 13:
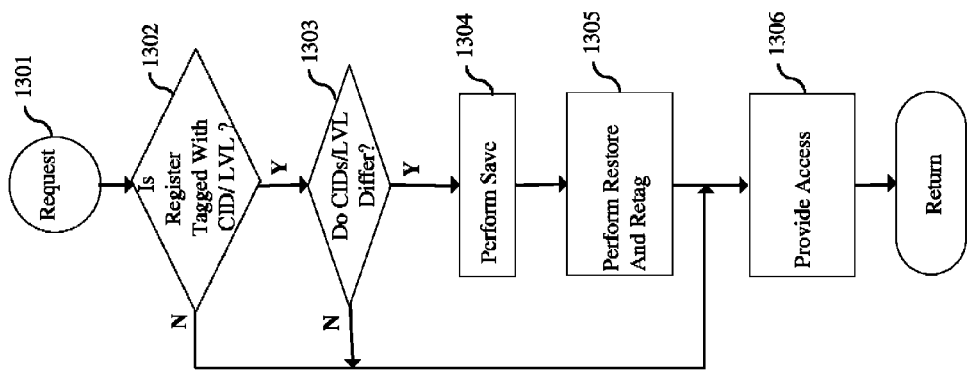
FIG. 13 is a flow diagram illustrating an exemplary state access process (i.e., a process of accessing a register and the state contained therein)

Additional Discussion Regarding the Details of the Disclosed Data Processing Method Embodiments FIG. 13 is a flow diagram illustrating an exemplary state access process (i.e., a process of accessing a register and the state contained therein) performed by a data processor, such at the data processor described in the data processor embodiments above. Specifically, an access request (i.e., a request to access a register and the state contained therein) can be received (1301). A determination can be made as to whether the requested register and, thereby, the state therein is tagged with a context identifier tag (CID) and, in the case of a stackable register, a stack level tag LVL) (1302). If the requested register is not tagged, then it can be directly accessed (806). If the state is tagged, a determination can be made as to whether the context identifier tag and, if applicable, stack level tag of the requesting context matches the context identifier tag and, if applicable, stack level tag on the requested register (1303). If the tag(s) match, then the requesting context can be provided with access to the register (1306). However, if the tag(s) differ (i.e., the context and/or level is different), the current context information (current state) of the register is saved in a context save area of memory using the appropriate context identifier tag and, if applicable, stack level tag (1304). Next, the context information (state) of the requesting context can be loaded from the context save area as indexed by the context identifier tag and, if applicable, stack level tag, of the requesting context (1305). Then, the requesting context can be provided with access to the register (1306).

Figure 14:
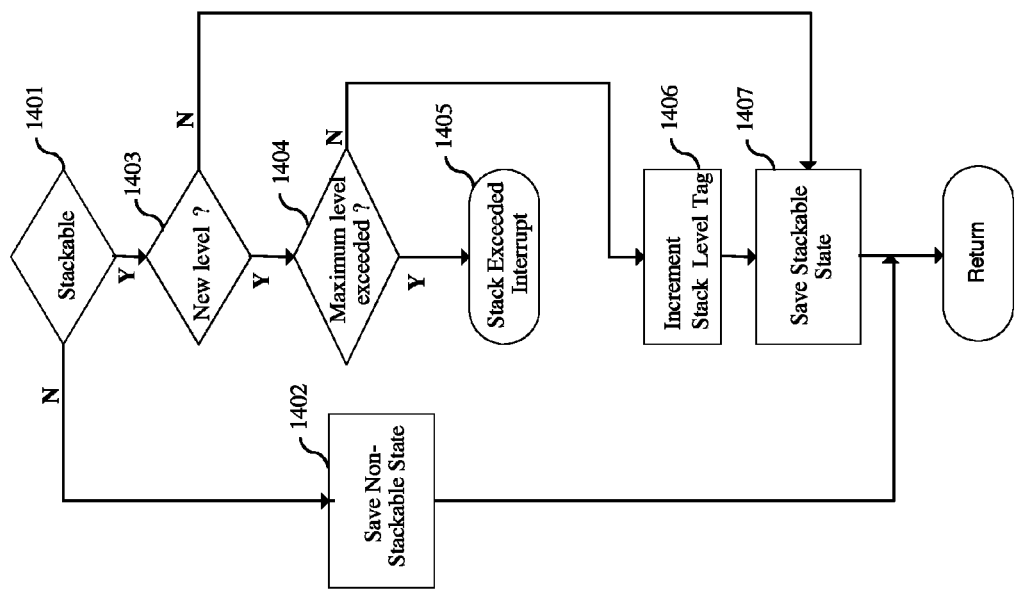
FIG. 14 is a flow diagram further illustrating the save process 1304 of FIG. 13.

FIG. 14 is a flow diagram further illustrating the save process 1304 of FIG. 13. Specifically, during the save process 1304, a determination can be made as to whether or not the requested register and, thereby the state contained therein is stackable (1401). If the state is not stackable, then it can be saved into at the correct location in the context save area of memory, as indexed by its context identifier tag (1402). If the state to be saved is stackable, a determination can be made as to whether a new stackable level is required (1403). If no new level is required, the state can be saved in the location in the context save area indexed by the context identifier tag and current stack level tag (1407). However, if a new level is required, a determination is made as to whether or not the maximum state level is exceeded (1404). If so, then a hardware error is generated (1405). However, if the level does not exceed the limit, the stack level tag can be incremented (1406) and the state can be saved in a location in the context save area indexed by the context identifier tag and the new, incremented, stack level tag (1407).

Figure 15:
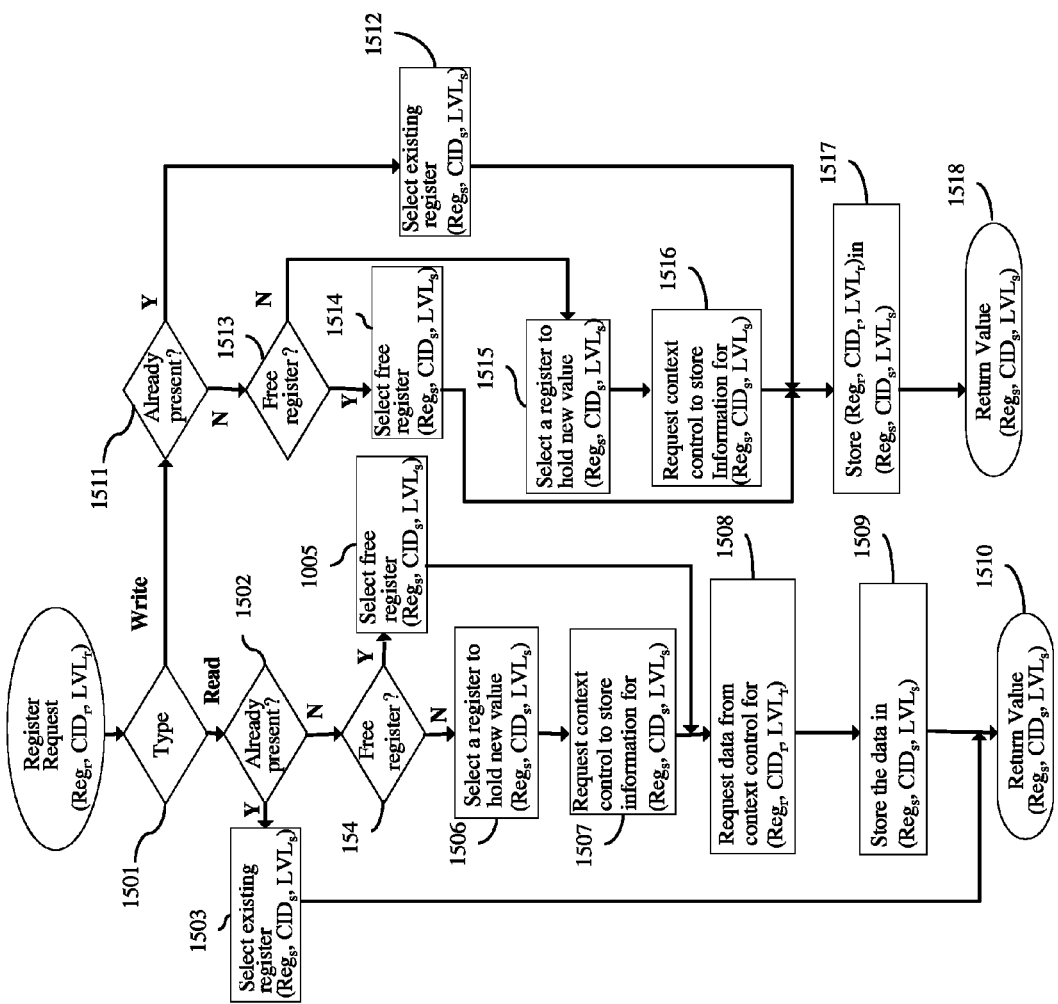
FIG. 15 is a flow diagram illustrating an exemplary state access process (i.e., a process of accessing a register and the state contained therein) performed by a data processor that specifically comprises a pool of registers.

FIG. 15 is a flow diagram illustrating an exemplary state access process (i.e., a process of accessing a register and the state contained therein) performed by a data processor that specifically comprises a pool of registers (e.g., see register pool 150 of the data processor 100 of FIG. 1 for the register pool 250 of the data processor 200 of FIG. 2). The pool 150, 250 can be larger than the number of registers required for operation. Each register in the pool can have an associated context identifier tag (CID) and, if the registers are stackable, a stack level tag (LVL) and a stackable bit.

In this case, a determination can be made as to whether the access request from a context for a requested register ($Reg_r$, $CID_r$, $LVL_r$), which is received at process 1301 of FIG. 13 and which specifies a register name ($Reg_r$), a context identifier tag ($CID_r$) and, if applicable, a stack level tag ($LVL_r$), is a read request or a write request (1501).

If the request ($Reg_r$, $CID_r$, $LVL_r$) is a read request, then a determination can be made as to whether or not a matching register ($Reg_r$, $CID_r$, $LVL_r$) is already in the pool (1502). If so, the matching register can be selected (1503) and the contents of the selected register ($Reg_r$, $CID_r$, $LVL_r$) can be returned (i.e., the requesting context can be provided with access to the context state information in the register) (1510).

If a matching register is not already in the pool, a determination can be made as to whether or not there is a free register (1504). If there is a free register, it can be selected (1005). Data for the requested register ($Reg_r$, $CID_r$, $LVL_r$) can be requested from the context control unit (1508) and that data can be stored in (i.e., written into) the selected ($Reg_s$, $CID_s$, $LVL_s$) (1509). Then, the contents thereof can be returned (i.e., the requesting context can be provided with access to the context state information in the register) (1510).

If there are no free registers, another register can be selected for use (1506). In this case, the context control unit can be requested to store the information for the selected register ($Reg_s$, $CID_s$, $LVL_s$) (i.e., to save the current context state information contained in the selected register) (1507). Then, data for the requested register ($Reg_r$, $CID_r$, $LVL_r$) (i.e., previously saved context state information of the requesting context) can be requested from the context control unit (1508). Next, this data can be stored in (i.e., written into) the selected register ($Reg_s$, $CID_s$, $LVL_s$) (1509) and the contents of thereof can be returned (i.e., the requesting context can be provided with access to the context state information in the register) (1510).

If the request is a write request, a determination can be made as to whether or not a matching register ($Reg_r$, $CID_r$, $LVL_r$) is already in the pool (1511). If so, then the matching register can be selected (1512) and the contents of the requested register ($Reg_r$, $CID_r$, $LVL_r$) can be stored in the selected register ($Reg_s$, $CID_s$, $LVL_s$) (1517) and returned (1518). If no matching register is present, a determination can be made as to whether or not there is a free register (1513). If there is a free register, it can be selected (1514). Then, the contents of the requested register ($Reg_r$, $CID_r$, $LVL_r$) can be stored in the selected free register ($Reg_s$, $CID_s$, $LVL_s$) (1517) and returned (1518). If there is no free register, another register can be selected (1515). In this case, a request can be made to the context control unit to store information from the selected register ($Reg_s$, $CID_s$, $LVL_s$) (i.e., to save the current context state information contained in the selected register) (1516). Then, the contents of the requested register ($Reg_r$, $CID_r$, $LVL_r$) can be stored (written-onto) the selected register ($Reg_s$, $CID_s$, $LVL_s$) (1517) and returned (i.e., the requesting context can be provided with access to the context state information in the register) (1518).

FIG. 16 is a table illustrating how the internal registers and state of an exemplary data processor, such as a PowerPC 440, are modified in accordance with the embodiments disclosed herein. Specifically, FIG. 16 illustrates which state are tagged, which state are untagged, and what registers have to be added. The stackable state for a PowerPC 440 would be the parameter passing registers GPR2 . . . GPR8 and the interrupt processing registers.

Figure 17:
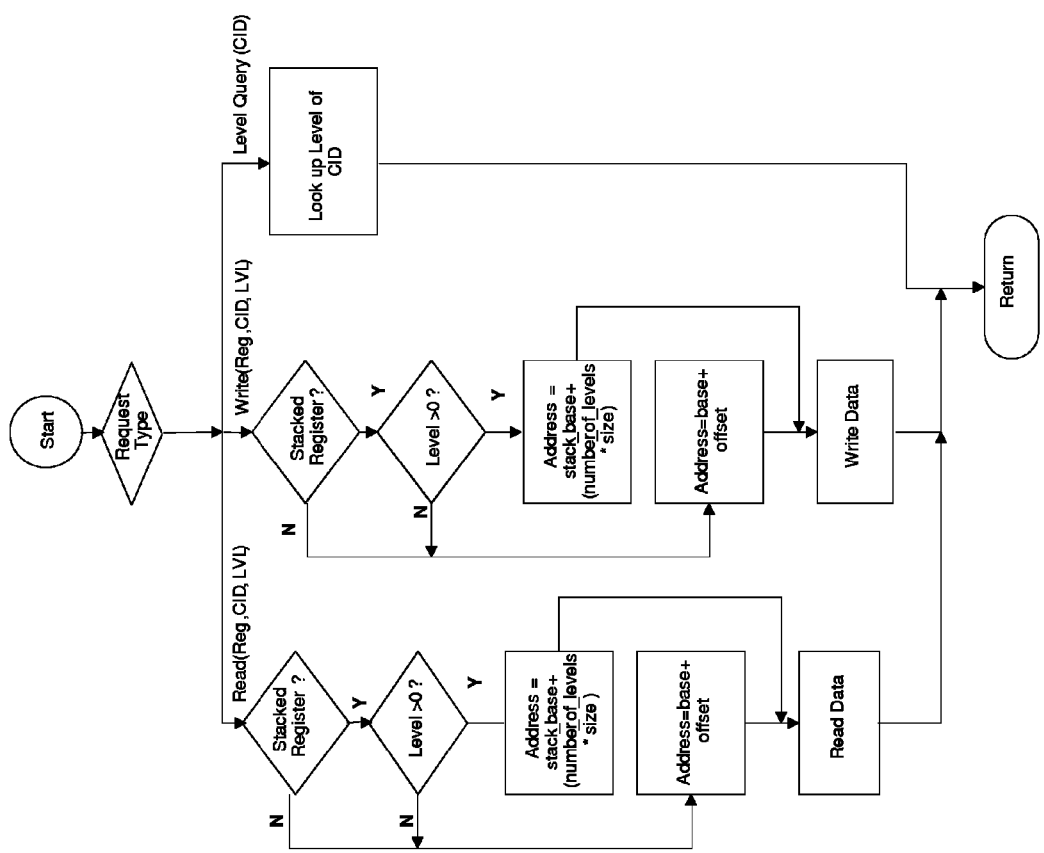
FIG. 17 is a flow diagram illustrating processing of three different types of access requests by the context control unit.

FIG. 17 is a flow diagram illustrating processing of three different types of access requests by the context control unit (e.g., by context 110 of FIG. 1 or context control unit 210 of FIG. 2) of the embodiments of the data processor as disclosed herein. These requests include: (1) a read request for a register specifying the register name (Ref.) and the context identifier tag (CID) and, if the registers are stackable, the stack level tag (LVL) associated with the requesting context; (2) a write request for a register specifying the register name (Reg.) and the context identifier tag (CID) and, if the registers are stackable, the stack level tag (LVL) associated with the requesting context; and (3) a query of the level given the context identifier tag (CID). As illustrate, for the read and write requests, the context control unit can calculate the address and the register will either be in the base save area or in the stack area. All non-stackable registers are in the base area. All stacked stackable registers are in the stack area. The first instance is in the base area.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be understood that the terminology used herein is for the purpose of describing particular embodiments only and is not intended to be limiting. As used herein, the singular forms "a", "an" and "the" are intended to include the plural forms as well, unless the context clearly indicates otherwise. It should further be understood that the terms "comprises", "comprising", "included", and/or "including", when used in this specification, specify the presence of stated features, integers, steps, operations, elements, and/or components, but do not preclude the presence or addition of one or more other features, integers, steps, operations, elements, components, and/or groups thereof. It should further be understood that corresponding structures, materials, acts, and equivalents of all means or step plus function elements in the claims below are intended to include any structure, material, or act for performing the function in combination with other claimed elements as specifically claimed. Finally, it should be understood that the above-description of the embodiments was presented for purposes of illustration and was not intended to be exhaustive or limiting. Many modifications and variations will be apparent to those of ordinary skill in the art without departing from the scope and spirit of the disclosed embodiments.

Therefore, disclosed above are embodiments of a data processor that provides non-hierarchical computer security enhancements for context states. Specifically, in the data processor embodiments, a context control unit uses context identifier tags associated with corresponding contexts (i.e., threads of execution) to control access by the contexts (i.e., by the threads of execution) to context information (i.e., context states of the threads of execution) contained in the processor's registers (e.g., non-stackable and/or stackable registers). For example, in response to an access request, the context control unit can grant a specific context read and write access to a register only when that register is tagged with a specific context identifier tag. If the register is tagged with another context identifier tag, the contents of the specific register are saved in a context save area of memory and the previous context states of the specific context are restored to the specific register before read and write access can be granted. In other data processor embodiments, the context control unit can provide the computer security enhancements while still facilitating authorized cross-context and/or cross-level communications. Also disclosed herein are associated data processing method embodiments.

What is claimed is:

1. A processor having non-hierarchical security enhancements for context states, said processor comprising:
   at least one register; and
   a context control unit using context identifier tags associated with corresponding contexts to control access by said contexts to said at least one register,
   said context control unit receiving, from a first context, an access request for a specific register and further performing the following:
      determining whether said specific register is tagged with a first context identifier tag associated with said first context; and
      when said specific register is tagged with said first context identifier tag, providing said first context with read and write access to said specific register.

2. The processor of claim 1, said context control unit further performing the following, when said specific register is tagged with a second context identifier tag associated with a second context:
   using said second context identifier tag to save, in a context save area of a memory, second context information from said specific register;
   using said first context identifier tag to restore first context information from said context save area to said specific register;
   retagging said specific register with said first context identifier tag; and
   providing said first context with read and write access to said specific register.

3. The processor of claim 1, further comprising multiple copies of a specific register and said context control unit receiving, from a first context, an access request for said specific register and further performing the following:
   determining whether any of said copies of said specific register is tagged with a first context identifier tag associated with said first context; and
   when at least one of said copies of said specific register is tagged with said first context identifier tag, selecting a first copy tagged with said first context identifier tag and providing said first context with read and write access to said first copy.

4. The processor of claim 3, said context control unit further performing the following, when none of said copies of said specific register is tagged with said first context identifier tag:
   selecting a second copy of said specific register tagged with a second context identifier tag associated with a second context;
   using said second context identifier tag to save, in a context save area of a memory, second context information from said second copy;
   using said first context identifier tag to restore first context information from said context save area to said second copy of said specific register;
   retagging said second copy of said specific register with said first context identifier tag; and
   providing said first context with read and write access to said second copy of said specific register.

5. The processor of claim 1, further comprising a pool of registers and said context control unit receiving, from a first context, an access request indicating a first register name and further performing the following:
   determining whether any register in said pool has said first register name and is tagged with a first context identifier tag associated with said first context; and
   when a first register in said pool has said first register name and is tagged with said first context identifier tag, providing said first context with read and write access to said first register.

6. The processor of claim 5, said context control unit further performing the following, when none of said registers in said pool has said first register name and is tagged with said first context identifier tag and when none of said registers is free:
   selecting a selected register from said pool, said selected register having a different register name and being tagged with a different context identifier tag associated with a second context;
   using said different context identifier tag to save, in a context save area of a memory, any context information from said selected register;
   renaming said selected register with said first register name and retagging said selected register with said first context identifier tag;
   using said first context identifier tag to restore first context information from said context save area to said selected register; and
   providing said first context with read and write access to said selected register.

7. The processor of claim 1, said registers comprising program registers and branch registers, said program registers comprising at least a general purpose register and a floating-point register and said branch registers comprising at least a link register, a count register and a condition register.

8. A processor having non-hierarchical security enhancements for context states, said processor comprising:
- at least one stackable register; and
- a context control unit using context identifier tags and stack level tags associated with corresponding contexts to control access by said contexts to said at least one stackable register,
- said context control unit receiving, from a first context, an access request for a specific stack level of a specific stackable register and further performing the following:
  - determining whether said specific stackable register is tagged with both a first context identifier tag and a first stack level tag associated with said first context; and
  - when said specific stackable register is tagged with said first context identifier tag and said first stack level tag, providing said first context with read and write access to said specific stackable register.

9. The processor of claim 8, said context control unit further performing the following, when said specific stackable register is tagged with at least one of a second context identifier tag different from said first context identifier tag and a second stack level tag different from said first stack level tag:
- using said second context identifier tag and said second stack level tag to save, in a context save area of a memory, second context information from said specific stackable register;
- using said first context identifier tag and said first stack level tag to restore first context information from said context save area to said specific stackable register;
- retagging said specific stackable register with said first context identifier tag and said first stack level tag; and
- providing said first context with read and write access to said specific stackable register.

10. The processor of claim 8, further comprising multiple copies of a specific stackable register and said context control unit receiving, from a first context, an access request for said specific stackable register and further performing the following:
- determining whether any of said copies of said specific stackable register is tagged with a first context identifier tag and first stack level tag associated with said first context; and
- when at least one of said copies of said specific stackable register is tagged with said first context identifier tag and said first stack level tag, selecting a first copy tagged with said first context identifier tag and said first stack level tag and providing said first context with read and write access to said first copy.

11. The processor of claim 10, said context control unit further performing the following, when none of said copies of said specific stackable register is tagged with said first context identifier tag and said first stack level tag:
- selecting a second copy of said specific stackable register tagged with a second context identifier tag and second stack level tag associated with a second context;
- using said second context identifier tag and second stack level tag to save, in a context save area of a memory, second context information from said second copy;
- using said first context identifier tag and first level to restore first context information from said context save area to said second copy of said specific stackable register;
- retagging said second copy of said specific register with said first context identifier tag and said first level; and
- providing said first context with read and write access to said second copy of said specific stackable register.

12. The processor of claim 8, further comprising a pool of registers comprising at least one stackable register and said context control unit receiving, from a first context, an access request indicating a first stackable register name and further performing the following:
- determining whether any stackable register in said pool has said first register name and is tagged with a first context identifier tag and a first stack level tag associated with said first context; and
- when a first stackable register in said pool has said first stackable register name and is tagged with said first context identifier tag and said first stack level tag, providing said first context with read and write access to said first stackable register.

13. The processor of claim 12, said context control unit further performing the following, when no stackable register in said pool has said first stackable register name and is tagged with said first context identifier tag and said first stack level tag and when no stackable register is free:
- selecting a selected stackable register from said pool, said selected stackable register having at least one of a different stackable register name, a different context identifier tag, and a different stack level tag associated with said different context identifier tag;
- using said different register name and said different context identifier tag and said different stack level tag to save, in a context save area of a memory, any context information from said selected stackable register;
- renaming said selected register with said first register name and retagging said selected register with said first context identifier tag and said first stack level tag;
- using said first register name and said first context identifier tag and said first stack level tag to restore first context information from said context save area to said selected register; and
- providing said first context with read and write access to said selected stackable register.

14. The processor of claim 8, said registers comprising program registers and branch registers, said program registers comprising at least a general purpose register and a floating-point register and said branch registers comprising at least a link register, a count register and a condition register.

15. A processor having non-hierarchical security enhancements for context states, said comprising:
- a plurality of registers comprising at least:
- first registers containing first context information and tagged with a first context identifier tag associated with a first context in a first context descriptor in a context control table; and
- second registers containing second context information and tagged with a second context identifier tag associated with a second context in a second context descriptor in said context control table; and
- a context control unit controlling cross-context communications comprising passing of said first context information in any of said first registers to said second context and passing of said second context information in any of said second registers to said first context, said controlling being based on instructions received from said first context and said second context and based on said second context descriptor.

16. The processor of claim 15, said instructions and said second context descriptor comprising:
- a cross-context call instruction from said first context specifying a set of registers to be passed from said first context to said second context and a set of registers to be accepted from said second context to said first context; and a cross-context return instruction from said second context specifying a set of registers to be returned from said second context to said first context; and said second context descriptor specifying a set of registers to be accepted from said first context to said second context.

17. The processor of claim 16, said context control unit further performing the following:

copying, for a cross context call, into said second registers, said first context information from a common subset of said set of registers to be passed specified in said cross-context call instruction and said set of registers to be accepted specified in said second context's context descriptor so as to provided said second context with read and write access to said copy of said first context information; and copying, for a cross context return, into said first registers, said second context information from said common subset of said set of registers to be returned specified in said cross-context return instruction and said set of registers to be accepted specified in said cross-context call instruction so as to provided said first context with read and write access to said copy of said second context information.

18. The processor of claim 17, said plurality of registers further comprising at least one stackable register and said context control unit further controlling cross-level communications.

19. A data processing method incorporating non-hierarchical security enhancements for context states, said method comprising:

providing a processor comprising at least one register; and
using context identifier tags associated with corresponding contexts to control access by said contexts to said at least one register, said using of said context identifier tags associated with said corresponding contexts to control said access by said contexts to said at least one register comprising:
  receiving, from a first context, an access request for a specific register;
  determining whether said specific register is tagged with a first context identifier tag associated with said first context; and,
  when said specific register is tagged with said first context identifier tag, providing said first context with read and write access to said specific register.

20. The method of claim 19, said using of said context identifier tags associated with said corresponding contexts to control said access by said contexts to said at least one register further comprising:

determining whether said specific register is tagged with a second context identifier tag associated with a second context;
when said specific register is tagged with said second context identifier tag associated with said second context, performing the following:
  using said second context identifier tag to save, in a context save area of a memory, second context information from said specific register;
  using said first context identifier tag to restore first context information from said context save area to said specific register;
  retagging said specific register with said first context identifier tag; and
  providing said first context with read and write access to said specific register.

21. The method of claim 19, said processor further comprising multiple copies of a specific register and said method further comprising:

receiving, from a first context, an access request for said specific register and further performing the following:
determining whether any of said copies of said specific register is tagged with a first context identifier tag associated with said first context;
when at least one of said copies of said specific register is tagged with said first context identifier tag, selecting a first copy tagged with said first context identifier tag and providing said first context with read and write access to said first copy; and
when none of said copies of said specific register is tagged with said first context identifier tag, performing the following:
selecting a second copy of said specific register tagged with a second context identifier tag associated with a second context;
using said second context identifier tag to save, in a context save area of a memory, second context information from said second copy;
using said first context identifier tag to restore first context information from said context save area to said second copy of said specific register;
retagging said second copy of said specific register with said first context identifier tag; and
providing said first context with read and write access to said second copy of said specific register.

22. The method of claim 19, said processor further comprising a pool of registers and said method further comprising:

receiving, from a first context, an access request indicating a first register name and further performing the following:
determining whether any register in said pool has said first register name and is tagged with a first context identifier tag associated with said first context;
when a first register in said pool has said first register name and is tagged with said first context identifier tag, providing said first context with read and write access to said first register; and
when none of said registers in said pool has said first register name and is tagged with said first context identifier tag and when none of said registers is free, performing the following:
selecting a selected register from said pool, said selected register having a different register name and being tagged with a different context identifier tag associated with a second context;
using said different register name and said different context identifier tag to save, in a context save area of a memory, any context information from said selected register;
renaming said selected register with said first register name and retagging said selected register with said first context identifier tag;
using said first register name and said first context identifier tag to restore first context information from said context save area to said selected register; and
providing said first context with read and write access to said selected register.

23. The method of claim 19, said registers comprising program registers and branch registers, said program registers comprising at least a general purpose register and a floating-point register and said branch registers comprising at least a link register, a count register and a condition register.

* * * * *